US010977520B2

(12) United States Patent
Turkelson et al.

(10) Patent No.: US 10,977,520 B2
(45) Date of Patent: Apr. 13, 2021

(54) TRAINING DATA COLLECTION FOR COMPUTER VISION

(71) Applicant: Slyce Acquisition Inc., Washington, DC (US)

(72) Inventors: Adam Turkelson, Washington, DC (US); Kyle Martin, Washington, DC (US); Christopher Birmingham, Washington, DC (US); Sethu Hareesh Kolluru, Washington, DC (US)

(73) Assignee: Slyce Acquisition Inc., Washington, DC (US)

( * ) Notice: Subject to any disclaimer, the term of this patent is extended or adjusted under 35 U.S.C. 154(b) by 0 days.

(21) Appl. No.: 16/719,716

(22) Filed: Dec. 18, 2019

(65) Prior Publication Data
US 2020/0210768 A1 Jul. 2, 2020

Related U.S. Application Data

(60) Provisional application No. 62/781,414, filed on Dec. 18, 2018.

(51) Int. Cl.
*G06K 9/62* (2006.01)
*G06K 9/00* (2006.01)
(Continued)

(52) U.S. Cl.
CPC ............ *G06K 9/6256* (2013.01); *G06K 9/00* (2013.01); *G06K 9/00013* (2013.01);
(Continued)

(58) Field of Classification Search
CPC .. G06K 9/00; G06K 9/00013; G06K 9/00201; G06K 9/00221; G06K 9/00711; G06K 9/00718; G06K 9/00744; G06K 9/00751; G06K 9/00765; G06K 9/00912; G06K 9/00919; G06K 9/00926; G06K 9/00973; G06K 9/00993; G06K 9/03;
(Continued)

(56) References Cited

U.S. PATENT DOCUMENTS 8,885,229 B1 * 11/2014 Amtrup ................ G06K 9/6267
382/190
9,218,364 B1 * 12/2015 Garrigues ............... G06F 16/50
(Continued)

OTHER PUBLICATIONS

Martineau, Kim, "This object-recognition dataset stumped the world's best computer vision models," MIT News 10 news.mit.edu/2019/object-recognition-dataset-stumped-worlds-best-computer-vision-models-12 Dec. 10, 2019 (6 pages).
(Continued)

*Primary Examiner* — Eric Rush
(74) *Attorney, Agent, or Firm* — Pillsbury Winthrop Shaw Pittman, LLP

(57) ABSTRACT

Provided is a process that includes: determining that a training set lacks an image of an object with a given pose, context, or camera; composing, based on the determination, a video capture task; obtaining a candidate video; selecting a subset of frames of the candidate video as representative; determining that a given frame among the subset depicts the object from the given pose, context, or camera; and augmenting the training set with the given frame.

26 Claims, 6 Drawing Sheets

(51) Int. Cl.
*G06K 9/32* (2006.01)
*G06T 7/00* (2017.01)
*G06K 9/46* (2006.01)

(52) U.S. Cl.
CPC ..... *G06K 9/00744* (2013.01); *G06K 9/00765* (2013.01); *G06K 9/00912* (2013.01); *G06K 9/00919* (2013.01); *G06K 9/00926* (2013.01); *G06K 9/32* (2013.01); *G06K 9/46* (2013.01); *G06K 9/6217* (2013.01); *G06K 9/6218* (2013.01); *G06K 9/6253* (2013.01); *G06K 9/6254* (2013.01); *G06K 9/6262* (2013.01); *G06T 7/0002* (2013.01); *G06T 2207/10016* (2013.01); *G06T 2207/30168* (2013.01)

(58) Field of Classification Search
CPC ........ G06K 9/033; G06K 9/036; G06K 9/20; G06K 9/32; G06K 9/36; G06K 9/46; G06K 9/62; G06K 9/6217; G06K 9/6218; G06K 9/6228; G06K 9/6232; G06K 9/6253; G06K 9/6254; G06K 9/6255; G06K 9/6256; G06K 9/6262; G06K 9/6263; G06T 7/0002; G06T 7/001; G06T 7/0014; G06T 2207/10016; G06T 2207/30168; G06N 5/022; G06N 20/00
USPC ................ 382/100, 103, 115, 135–137, 141, 382/154–160, 165, 170, 181, 190, 224, 382/225, 227, 228, 254, 255, 291, 305, 382/312, 325; 706/10, 11, 14–16, 20, 21, 706/25, 26; 700/28–31, 44–48
See application file for complete search history.

(56) References Cited

U.S. PATENT DOCUMENTS

| | | | | |
|---|---|---|---|---|
| 9,552,535 | B2* | 1/2017 | Movellan | G06K 9/6262 |
| 9,753,696 | B2 | 9/2017 | Livshits et al. | |
| 9,767,419 | B2 | 9/2017 | Venanzi et al. | |
| 9,779,289 | B2 | 10/2017 | Movellan et al. | |
| 10,262,233 | B2* | 4/2019 | Takimoto | G06K 9/6262 |
| 10,803,336 | B2* | 10/2020 | Badr | G06K 9/6262 |
| 2011/0135166 | A1* | 6/2011 | Wechsler | G06K 9/627 382/118 |
| 2014/0015855 | A1* | 1/2014 | Denney | G06K 9/6218 345/629 |
| 2016/0086029 | A1* | 3/2016 | Dubuque | G06K 9/00671 382/159 |
| 2017/0185898 | A1* | 6/2017 | Paul | G06N 20/00 |
| 2017/0287170 | A1* | 10/2017 | Perona | G06K 9/00664 |
| 2018/0114332 | A1* | 4/2018 | Desai | G06K 9/4628 |
| 2019/0073557 | A1* | 3/2019 | Matsuda | G06K 9/4609 |
| 2019/0272481 | A1* | 9/2019 | Price | G06F 1/206 |
| 2019/0347522 | A1* | 11/2019 | Nir | G06K 9/6256 |
| 2020/0104720 | A1* | 4/2020 | Bao | G06K 9/6256 |

OTHER PUBLICATIONS

Haldar, Malay, "How much training data do you need?" Medium https://medium.com/@malya.haldar/how-much-training-data-do-you-need-da8ec091e956 Nov. 28, 2015 (7 pages).

Mitsa, Theophano, "How Do You Know You Have Enough Training Data?" Towards Data Science, https://towardsdatascience.com/how-do-you-know-you-have-enough-training-data-ad9blfd679ee Apr. 22, 2019 (15 pages).

Kolluru, Sethu Hareesh, "How Slyce Solves Visual Search—Part 1" Medium, https://medium.com/slyce-engineering/how-slyce-solves-visual-search-part-1-72ec34a093a2 Sep. 13, 2019 (22 pages).

Kolluru, Sethu Hareesh, "How Slyce Solves Visual Search—Part 2" Medium, https://medium.com/slyce-engineering/how-slyce-solves-visual-search-part-2-648736b036d0 Sep. 23, 2019 (14 pages).

Howard et al., "MobileNets: Efficient Convolutional Neural Networks for Mobile Vision Applications," Google Inc. arXiv:1704.04861v1 [cs.CV] Apr. 17, 2017 (9 pages).

Wang, Chi-Feng, "A Basic Introduction to Separable Convolutions," Towards Data Science, https://towardsdatascience.com/a-basic-introduction-to-separable-convolutions-b99ec3102728 Aug. 13, 2018 (16 pages).

Chandra, Harsh, "Hardware acceleration for machine learning on Apple and Android devices,"https://heartbeat.fritz.ai/hardware-acceleration-for-machine-learning-on-apple-and-android-f3e6ca85bda6 Oct. 8, 2018 (19 pages).

* cited by examiner

TRAINING DATA COLLECTION FOR COMPUTER VISION

CROSS-REFERENCE TO RELATED APPLICATIONS

This patent claims the benefit of U.S. Provisional Patent Application No. 62/781,414, titled "TRAINING DATA COLLECTION FOR COMPUTER VISION," filed on 18 Dec. 2018. The entire content of the afore-listed earlier-filed application is hereby incorporated by reference for all purposes.

BACKGROUND

1. Field

The present disclosure relates generally to computer vision and, more specifically, to training data acquisition for computer vision models.

2. Description of the Related Art

Moravec's paradox holds that many types of high-level reasoning require relatively few computational resources, while relatively low-level sensorimotor activities require relatively extensive computational resources. In many cases, the skills of a child are exceedingly difficult to implement with a computer, while the added abilities of an adult are relatively straightforward. A canonical example is that of computer vision where it is relatively simple for a human to parse visual scenes and extract information, while computers struggle with this task.

Notwithstanding these challenges, computer vision algorithms have improved tremendously in recent years, particularly in the realm of object recognition and localization within various types of images, such as two-dimensional images, depth images, stereoscopic images, and various forms of video. Variants include unsupervised and supervised computer vision algorithms, with the latter often drawing upon training data sets in which objects in images are labeled. In many cases, trained computer-vision models ingest an image, detect an object in an image from among an ontology of objects, and indicate a bounding area in pixel coordinates of the object along with a confidence score indicating a likelihood that what is detected is actually the object.

SUMMARY

The following is a non-exhaustive listing of some aspects of the present techniques. These and other aspects are described in the following disclosure.

Some aspects include a process including: determining that a training set lacks an image of an object with a given pose, context, or camera; composing, based on the determination, a video capture task; obtaining a candidate video; selecting a subset of frames of the candidate video as representative; determining that a given frame among the subset depicts the object from the given pose, context, or camera; and augmenting the training set with the given frame.

Some aspects include a process including obtaining, with a mobile computing device, an image-capture task from a remote server, where: the image-capture task includes a request for a video of an object to be captured, the image-capture task provides an indication of the object to be captured via the video, and the image-capture task causes the mobile computing device to present instructions via a native application executing on the mobile computing device, the instructions describing how the video of the object is to be captured. The process further includes obtaining, with the mobile computing device, a candidate video of the object, where the candidate video includes the object captured from multiple perspectives and with multiple lighting conditions, where obtaining the candidate video includes: determining, with the mobile computing device, while obtaining the candidate video, feedback indicating whether first criteria along a first dimension and second criteria along a second dimension are satisfied based on the instructions, and causing, with the mobile computing device, while obtaining the candidate video, (i) the feedback and (ii) an indication of one or more actions capable of being performed to adjust a video recording process, to be presented via the native application. The process still further includes providing, with the mobile computing device, to the remote server system, (i) the candidate video, (ii) features of the object extracted from the candidate video, or (iii) the candidate video and the features extracted from the candidate video, where the remote server system is configured to generate training data for training an object recognition model.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
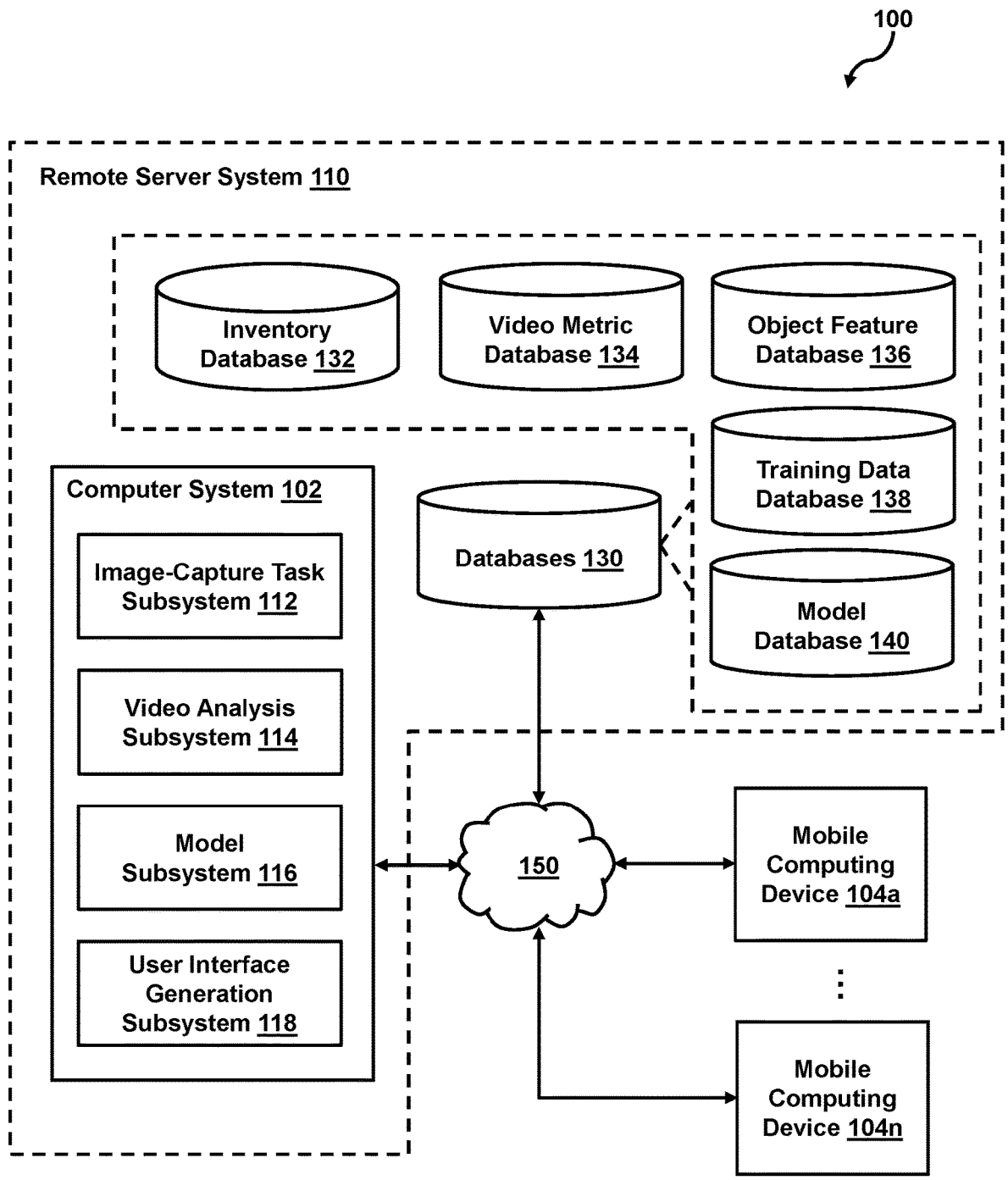
FIG. 1 illustrates an example system for obtaining images for a training data set for an object recognition model, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer vision. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Existing computer-vision object recognition and localization approaches often suffer from lower accuracy and are more computationally expensive than is desirable. Various phenomena contribute to errors, including blurring, irrelevant objects in the camera's field of view, novel camera poses relative to a training set, and suboptimal lighting in run-time images. In many cases, these challenges are compounded by use cases in which training data sets are relatively small while candidate objects in an object ontology are relatively large. For example, challenges may training an object recognition model may occur when training data sets include less than 100 example images of each object, less than 10 example images, or that include a single image while candidate objects in an object ontology include more than 1,000 objects, more than 10,000 objects, more than 100,000 objects, or more than one million objects.

Existing services to crowd-source training data collection for machine-learning algorithms are not well suited for the above-described use cases. Existing services that dispatch users to capture images of places, objects, or both, are often not well suited for the type of training data that is needed. In many cases, the images that are obtained via such existing services are from a single field of view at a single pose. Furthermore, in many cases the images are not particularly diverse with respect to background, lighting position and condition, camera characteristics, and object configuration (e.g., folded, draped, etc.). Resulting training data sets often yield models that are insufficiently robust to real-world variation and that fail to sufficiently generalize out of sample. (None of which is to suggest that the above techniques or anything else herein is disclaimed, as aspects of the approaches below may also be used with traditional techniques.)

The machine learning techniques that can be used in the systems described herein may include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions).

In some embodiments, a feature extraction process may use deep learning processing to extract features from an image. For example, a deep convolution neural network (CNN), trained on a large set of training data (e.g., the AlexNet architecture, which includes 5 convolutional layers and 3 fully connected layers, trained using the ImageNet dataset) may be used to extract features from an image. In some embodiments, to perform feature extraction, a pre-trained machine learning model may be obtained, which may be used for performing feature extraction for images from a set of images. In some embodiments, a support vector machine (SVM) may be trained with a training data to obtain a trained model for performing feature extraction. In some embodiments, a classifier may be trained using extracted features from an earlier layer of the machine learning model. In some embodiments, preprocessing may be performed to an input image prior to the feature extraction being performed. For example, preprocessing may include resizing, normalizing, cropping, etc., to each image to allow that image to serve as an input to the pre-trained model. Example pre-trained networks may include AlexNet, GoogLeNet, MobileNet-v2, and others. The preprocessing input images may be fed to the pre-trained model, which may extract features, and those features may then be used to train a classifier (e.g., SVM). In some embodiments, the input images, the features extracted from each of the input images, an identifier labeling each of the input image, or any other aspect capable of being used to describe each input image, or a combination thereof, may be stored in memory. In some embodiments, a feature vector describing visual features extracted from an image from the network, and may describe one or more contexts of the image and one or more objects determined to be depicted by the image. In some embodiments, the feature vector, the input image, or both, may be used as an input to a visual search system for performing a visual search to obtain information related to objects depicted within the image (e.g., products that a user may purchase).

In some embodiments, context classification models, the object recognition model, or other models, may be generated using a neural network architecture that runs efficiently on mobile computing devices (e.g., smart phones, tablet computing devices, etc.). Some examples of such neural networks include, but are not limited to MobileNet V1, MobileNet V2, MobileNet V3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster. Generally, neural networks running on mobile computing devices include a stack or stacks of residual blocks. Each residual blocks may include an expansion layer, a filter layer, and a compression layer. With MobileNet V2, three convolutional layers are included: a 1×1 convolution layer, a 3×3 depthwise convolution layer, and another 1×1 convolution layer. The first 1×1 convolution layer may be the expansion layer and operates to expand the number of channels in the data prior to the depthwise convolution, and is tuned with an expansion factor that determines an extent of the expansion and thus the number of channels to be output. In some examples, the expansion factor may be six, however the particular value may vary depending on the system. The second 1×1 convolution layer, the compression layer, may reduce the number of channels, and thus the amount of data, through the network. In Mobile Net V2, the compression layer includes another 1×1 kernel. Additionally, with MobileNet V2, there is a residual connection to help gradients flow through the network and connects the input to the block to the output from the block.

As described herein, the phrases "computer-vision object recognition model" and "object recognition computer-vision model" may be used interchangeably.

Some embodiments may generate a user interface that guides users to acquire particularly robust training data for object recognition models and other computer vision algorithms. Some embodiments may cause mobile computing devices (e.g., smart phones, wearable computing devices, and the like) to present such a user interface, and a camera of the mobile computing device may obtain videos or other sets of images of an object. The images may be added to a training data set used to train a model, such as a computer-vision object recognition model, to detect the object in other runtime images (e.g., those that are out-of-sample from the training set). In some cases, the computer-vision object recognition model may be configured to recognize, detect, and localize objects in a relatively large ontology like those described above. As an example, a native application executing on a mobile computing device may display a user interface with content describing an image-capture task or tasks to obtain a video of an object. As described herein, the "image-capture task" may also be referred to interchangeable as a task, such as a task that includes a request for a video of an object to be captured, provides an indication of the object to be depicted in the video, and the task causes a mobile computing device to present instructions via a native application executing on the mobile computing device, the instructions describing how the video of the object is to be captured. The object may be any object, such as an object purchasable at a brick-and-mortar store (e.g., a particular model of a microwave, a jacket of a particular color or size, etc.), or an object that exists in a given environment (e.g., a particular type of dog or cat, a certain type of tree, etc.). In some cases, the image-capture task may specify various attributes of the video, like camera path and pose relative to the object, a context or contexts (e.g., lighting, background scenes, object configuration (like whether clothes are folded, on a person, or on a hanger, or whether a microwave was installed, whether the microwave's door is open fully, open partially, or closed), a camera model, and an operating system or device type of the mobile computing device (e.g., a smartphone model)), among others. In some embodiments, the image-capture task may be discoverable by a user operating a mobile computing device via a native application executing on the mobile computing device. In some embodiments, the image-capture task may include (i) information regarding the object to be searched for by the user, and (ii) instructions regarding how a video of the object is to be obtained. In some cases, the native application may determine whether a data feed from the camera or other image capturing component of the mobile computing device or communicatively coupled to the mobile computing device corresponds to the image-capture task, and may provide feedback (e.g., visual, audible, haptic, etc.) via the user interface or via other components of the mobile computing device indicative of the feedback.

Some embodiments may select image-capture tasks for users based on a marginal entropy gain of the image-capture task. For instance, a native application, upon launching on the mobile computing device, may query a remote server system for an image-capture task with an identifier that indicates attributes of the mobile computing device, a user operating the mobile computing device, or both. The remote server system may select an image-capture task based on a current collection of data used to generate training data for training an object recognition model. For instance, some cases may include the remote server system determining whether the mobile computing device is of a type for which image data has not yet been obtained of a given object (or set of objects), thereby potentially acquiring images for the training data set from an additional and diverse set of user equipment. Further, some embodiments may select image-capture tasks responsive to a request from mobile computing devices based on a diversity or quantity of candidate objects in an object ontology. For example, if only a single image of a jacket (e.g., in a particular color, pattern, or size; draped, worn, or laying on a surface) is included within a fashion-related corpus of training images, then (e.g., in response) an image-capture task may be generated (e.g., selected, composed, or otherwise obtained) for obtaining additional images of the jacket (or for other images of other colors, patterns, sizes, or other forms of configuration). In some embodiments, an image-capture task, which may also be referred to herein interchangeably as a "mission," or a sub-task of the image-capture task, may be initiated based on (or an image-capture task may specify) an object indication identifying an object. For example, if the object is a product (e.g., a purchasable good or service), an indication of the product, which may also be referred to herein interchangeably as a "product identifier," may be a barcode associated with the product, Quick Response (QR) code associated with the product, a Stock Keeping Unit (SKU) of the product, a serial number of the product, or a name of the product. In some embodiments, the indications of the object (e.g., the product identifiers) may be scanned by (or to be scanned as part of an image-capture task) a mobile computing device or a scanning device communicatively coupled to the mobile computing device (e.g., a handheld scanner). Some embodiments may include using (e.g., based on) the product identifier to automatically retrieve metadata associated with a product (or such data may be cached in a native applications on a mobile computing device's memory before entering a store responsive to a user accepting an image-capture task to render the native application more robust to loss of network connections in stores), and some embodiments may include labeling objects within an image being captured (or the images themselves) with the metadata.

In some cases, captured images or videos may be held in a buffer of the native application, and the native application may periodically (or in response to an OS event) poll for whether the mobile computing device has a network connection. Upon detecting a connection (e.g., upon the user leaving an area of a store where network connectivity was impaired, as can often happen with steel shelving approximating a Faraday cage), the native application may upload the captured images or video and associate the images or video to server-side components.

In some embodiments, image-capture tasks may be generated (e.g., by server-side components) based on a particular goal, such as training a specific type or instance of object recognition model or making a model robust to (e.g., capable of discriminating among or from) a particular object or type of object. Some embodiments include an image-capture task including multiple sub-tasks that may be selected based on the specific type (e.g., an individual SKU, an instance without regard to size, an instance without regard to color, or a class of products, like drills without regard to SKU) of object that the object detection model is to recognize. For example, if the object recognition model to be trained is a furniture model, (e.g., a computer vision model configured to detect a table), then (e.g., in response to this occurrence) the sub-tasks within a related image-capture task may be generated to request or cause images of tables to be obtained (e.g., generally or specifically with respect to a type, size, model of table). In some embodiments, if a particular product identifier is scanned or to be scanned corresponds to a product with which images of that product have already been provided by one or more product providers (e.g., via a product catalog supplied by a retailer or vendor), information about the product may already be stored in a database accessible to a remote server system. Therefore, the sub-tasks within the image-capture task may relate to obtaining specific images of the product to supplement or enhance the stored images of that product (e.g., an image of the table from a particular angle, with a particular amount of ambient light, in a particular setting, etc.).

Assigning an image-capture task to a mobile computing device may include sending the mobile computing device instructions by which the mobile computing device forms a user interface. In some cases, the image-capture task includes a request for a video of an object to be captured, and provides an indication of the object to be captured via the video (e.g., a SKU). In some cases, the image-capture task may cause and prose instructions to be presented via a native application executing on the mobile computing device, where the instructions may include a first instruction to capture an image of the indication of the object (e.g., scan a barcode of a product) with a camera of the mobile computing device before beginning the image-capture task, and additional instructions describing how a video of the object is to be captured. Some examples include the native application receiving an image including a barcode of a product, parsing or determining a SKU from the images of the barcode, and determining that the barcode in the image matches that specified by the image-capture task. In some cases, an image-capture task may specify indications of multiple objects (e.g., multiple SKUs), any one of which is acceptable, or all of which are required. In response to detecting the absence of a match, the native application may alert a user and prevent subsequent images from being added to a training data set until the correct indication is scanned. In some cases, the instructions of the image-capture task may also include features of the object corresponding to the indication to facilitate object detection by the mobile computing device during training. For instance, this may include a user interface depicting the camera's view being augmented with a bounding box of the object during scanning.

In some embodiments, the image-capture task and its various sub-tasks may be influenced by data analysis that has already been performed. For example, for a particular object, historical information included within a training data database may be mined to determine what information is already logged, what information can be scraped from third party online resources (e.g., via the Internet), and what information is needed. Furthermore, the object recognition model may include or be associated with classifiers configured to extract certain aspects of an object, such as color, pattern, texture, basic object recognition and detection, or a combination thereof. Using the mini-classifiers, information about what the object in question is can be determined to identify what additional images, if any, would be beneficial to obtain to improve object recognition scope and accuracy.

In some embodiments, the image-capture task may be to obtain a video of a given (e.g., specified by a SKU, product name, or model name) object. The image-capture task may cause instructions to be presented via a native application's user interface (e.g., on a display screen or audio interface) that may provide an indication of the object to be captured by the video (e.g., a barcode, SKU, QR code for a product), and where (e.g., a store, a particular location within the store, a household, etc.) the object may be found. For example, the image-capture task may cause the native application to indicate a particular drill to be found, a store where the drill may be sold, a location within the store of where the drill may be shelved, a barcode identifying the drill, or a combination thereof. Upon locating the object (e.g., the drill), the user may instruct the native application to record the indication of the object (e.g., scan a barcode for the drill) and the native application may provide (e.g., present) instructions regarding how to capture a video of the object to the user. For example, the instructions may indicate how the user should rotate his/her mobile computing device about the object to capture different angles, backgrounds, and lighting aspects of the object. In some cases, the user may be instructed to position the object in multiple configurations and similar scans may be performed in the different configurations. For example, the different configurations may include the object being held in hand, draped on a hanger or other piece of furniture, folded on a shelf, and the like. In some embodiments, the native application may access (e.g., poll) one or more inertial measurement units (IMUs) resident on the mobile computing device and obtain a multi-dimensional time series of detected accelerations (e.g., along three or more or six axes). In some cases, in real-time or at training-time, client-side or server-side, embodiments may associate the time series with captured images (e.g., frames of a video) corresponding to the measurements. Some embodiments may determine based on the time series and images whether the pose of the mobile computing device and scene configuration is correct (e.g., within specified parameters, like within tolerances for object distance, camera pose, lighting intensity, etc.). For instance, some embodiments may infer camera pose with a Kalman filter and compare an inferred pose to a target pose to determine an error vector (e.g., in three or six spatial dimensions). Some embodiments may cause the mobile computing device to present an overlaid augmented reality display on a user interface depicting captured images or video based on the error vector, like arrows indicating how the camera should be manipulated in space to reduce the error vector. In some embodiments, IMU data, lighting data, and other sensor data from the mobile computing device may be used to obtain depth information for three-dimensional locating and point anchoring. In some embodiments, a fixed box may be displayed with a user interface of the native application, and the sub-tasks of the image-capture task to be performed is to capture a video of the object while moving the mobile computing device around the object, all while keeping the object displayed within the fixed box (overlaid in a user interface depicting the images being captured by the camera). In some embodiments, the IMU data, lighting data, other sensor data, or a combination thereof, may be used to generate a three-dimensional (3D) model, which may be used for generating training data of unseen perspectives (e.g., angles) of an object.

In some embodiments, the captured video may be provided back to the remote server system for further processing. For example, the remote server system may be configured to determine bounding box coordinates (like in pixel space) of the object at issue, perform image enhancement, identify salient frames, and the like. In some cases, captured video may be associated in memory with an image or scan result of an indicator of an object (e.g., a barcode of the object). In some cases, captured video (or a subset of frames thereof) may be associated in memory with a geolocation of the object, like an identifier of a brick and mortar store in which the object was imaged via the captured video. In some cases, captured video may be associated with attributes of the camera, such as an identifier of a model of the camera, an identifier of the mobile computing device including the camera, optical properties or configuration of the camera, lighting attributes of an environment in which the video is captured, an operating system of the mobile computing device, an application used to capture the video, and the like. In some cases, frames of video may be associated with values based on readings of IMUs taken concurrent with the frames. For example, data indicating an inferred pose of the camera relative to the object or a position along a route with six degrees of freedom may be captured, recorded, extracted, or otherwise determined based on outputs from IMUs obtained from the mobile computing device. In some cases, the camera may be a depth-sensing camera, such as a stereoscopic camera or other form of computational photography camera, and information about a light field (e.g., light intensity and direction for multiple directions at each of a plurality of points on a plane) may be captured and input into the training data set. Some embodiments may engage a machine-learning co-processor of the mobile computing device to provide real-time feedback on the video as the video is captured. For example, the machine-learning co-processor may score the video as the video is being captured based upon marginal gains in information about the object being imaged.

In some embodiments, images may be adjusted within various (e.g., each) images of a video to reduce bandwidth and memory usage relatively to implementations that natively upload all of the capture video. Some embodiments may detect the object in question in one or more frames from the video and may discard frames preceding or following frames where the object appeared. Some embodiments may crop images to exclude portions not depicting the object, (e.g., outside a bounding box of the object in question). Some embodiments may configure the images based on the location of the object in the images. For example, a white balance may be determined from raw camera sensor data based on a white component of the object or location of the object within a given image, a dynamic range may be determined based on whether portions of the object in the image are within the bounds of the camera and image format (in some cases, modulating exposure of the camera in subsequent frames to place the object within such bounds), and the like. Some embodiments may modulate image compression within a frame based on the location of an object. For instance, some embodiments may compress frames with a lossy compression algorithm (like JPEG, MPEG (1 to 4), H.265/HEVC, etc.), and the amount of data loss within different areas of the frame may be modulated such that areas of a frame depicting an object (like where the object is detected or in a bounding box on a UI showing images from the camera where the user is requested to position the object) have less loss of data (and thus lower compression ratios) while areas not depicting the object have greater loss of data (and thus higher compression ratios). For example, some embodiments may select different quantization matrices for different areas (e.g., square blocks in a tiling) of an image to modulate data loss/compression, e.g., before dividing a discrete cosine transform coefficient matrix by the quantization matrix in an element-by-element division and rounding to the nearest integer, such that larger values in the quantization matrix tend to result in zero values in the result, and more prevalent use of larger values corresponding to higher frequency components tend to increase compression ratios, thereby increasing efficiency of subsequent run-length encoding of the result.

Upon completion, the video and accompanying metadata may be provided to a local or remote server system including computer vision processing functionality. For example, the video may be provided to a remote server system with an indication of the object (e.g., barcode) and any of the other captured information noted above. In some embodiments, the remote server system may pre-process the captured video, including selecting a subset of frames or combining information from consecutive frames. For example, the video may be segmented into a plurality of frames, where each frame may include information indicating the camera's pose (e.g., with six coordinates, three indicating spatial position and three indicating orientation) with respect to the object, ambient lighting conditions, eye gaze information (e.g., if a front-facing camera is available to obtain gaze direction), and the like. In some embodiments, the sampling rate for the video may be adjusted to increase or decrease a number of images obtained from the captured video. For example, the computer vision system may sub-sample the video at 60 frames per second (fps), 100 fps, or 200 fps. Quality checks with respect to the blurriness or recognizability of the particular item within each photo may be performed and, if the quality check satisfies quality criteria, the images (or features extracted therefrom) may be added to a database as being associated with that particular object, an identifier for the object from an object ontology, or both. Furthermore, in some embodiments, the remote server system may perform feature extraction processes to each newly added image to obtain new features for that item, and the new features may be stored in the database as being associated with that particular object.

In some embodiments, a plurality of images obtained from a captured video may be used to train a computer vision object recognition model for synthesizing new and unique objects that physically may not yet exist or were outside a training data set used to train the model. Using the information about how an object is displayed when at various orientations, ambient light levels, and backgrounds may allow the object recognition model to learn how a new instance of a same or similar object may appear. For example, an object recognition model may be trained to create a synthetic table by ingesting training data related to the various ways that different tables appear within images taken by mission-based captured videos, where mission includes directing an individual to capture one or more images or videos of one or more tables at various orientations, ambient light levels, backgrounds, or a combination thereof. In some embodiments, the object recognition model may be a generative mode where the roles of inputs and outputs may be reversed, and some embodiments may synthesize an image of an object outside the training data set by specifying inputs that correspond to the outputs of the object recognition model.

In some embodiments, the training data may also be used as an online learning tool. For example, a video of a task may be submitted by a user to a remote server system including computer vision functionality. The computer vision functionality may include, access, or otherwise employ an object recognition model to determine whether an image includes a particular object, and an application instance running on a mobile computing device may be solicited for feedback regarding the object recognition model's accuracy. If the object recognition model accurately identifies the object as being a particular item, such as a table or coffee mug, then the feedback may be used to reinforce the object recognition model's accuracy. However, if the object recognition model misidentifies the object, the feedback may be used to adjust weights and biases associated with different nodes of the object recognition model to improve the model's accuracy. In some embodiments, the online learning feature of the object recognition model may be consumer facing so as to crowd source information. Therefore, the application instance may be generated to include the learning component for reinforcing the accuracy of the object recognition model's results and identifying where additional focus is needed.

In some embodiments, some or all of an object recognition model may be offloaded from a remote server system to a local mobile computing device. For instance, a particular portion of object recognition model may be trained on the mobile computing device, and then that portion may be provided to the remote server system to be conjoined with the remaining object classification aspects, and for further refinement. For example, a specific mobile computing device may train an object recognition model for detecting tables. The mobile computing device's object recognition model may include features for identifying tables, and may include a set of weights for identifying tables. When an image is captured by the mobile computing device, the "table" object recognition model may generate values for the weights based on the objects identified within the captured image, and provide the values to the remote server system, which may be merged with one or more other mobile computing devices performing similar tasks.

FIG. 1 illustrates an example system for obtaining images for a training data set for an object recognition model, in accordance with various embodiments. In some embodiments, a system 100 may include a remote server system 110, a network or combination of networks 150, and one or more mobile computing devices 104a-104n. Mobile computing devices 104a-104n may be referred to collectively as mobile computing devices 104, and individually as mobile computing device 104. Each instance of mobile computing devices 104 may include an image capturing component, such as a camera, however some instances of mobile computing devices 104 may be communicatively coupled to an image capturing component. For example, a mobile computing device 104 may be wirelessly connected (e.g., via a Bluetooth connection) to a camera, and images captured by the camera may be viewable, stored, edited, shared, or a combination thereof, on mobile computing device 104.

Remote server system 110 may include a computer system 102, databases 130, and other components, each of which are configured to communicate with mobile computing devices 104 via networks 150. In some embodiments, computer system 102 may include an image-capture task subsystem 112, a video analysis subsystem 114, a model subsystem 116, a user interface generation subsystem 118, and other components. Databases 130 may include an inventory database 132, a video metric database 134, object feature database 136, training data database 138, and model database 140. Each of databases 132-140 may be a single instance of a database or may include multiple databases, which may be co-located or distributed amongst a number of server systems.

In some embodiments, image-capture task subsystem 112 is configured to generate and output one or more image-capture tasks. In some embodiments, the image-capture tasks may be generated based on data needed for training an object recognition model. For example, an object recognition model may be trained to recognize a drill within a given image using a collection of images of drills. However, if a training data set of images of drills only includes a small number (e.g., less than 10, less than 5, less than 2) of images of a drill, the object recognition model may be unable to recognize a drill within a newly received image unless that image is formatted in a similar manner as one of the images from the training data set. Therefore, it may be beneficial to obtain additional images depicting a drill, each image having the drill orientated in a different manner, such as different poses or different contexts (e.g., different lighting condition, different background settings, etc.).

In some embodiments, image-capture task subsystem 112 determines an object or a set of objects that an image-capture task will be directed towards. To determine the objects, image-capture task subsystem 112 may access training data database 138. Training data database 138 may include training data sets, where each training data set is associated to a particular object or category of objects with which an object recognition model uses or will use to train that object recognition model for recognizing the object within an input image. For example, training data database 138 may include a training data set including a plurality of images depicting a table, and this training data set may be used to train an object recognition model to recognize whether an input image depicts a table. As another example, training data database 138 may include a training data set including a plurality of images depicting dogs, and this training data set may be used to train an object recognition model to recognize whether an input image depicts a dog. In some embodiments, training data database 138 may include an index that includes a listing of each training data set stored within training data database 138, a name of the object that the training data set corresponds to, an object identifier of the object, and a number of images that the training data set includes. Table 1, described below, includes a sample index of training data sets that may be stored within training data database.

TABLE 1

| Training Data Set ID | Depicted Object | Object ID | Number of Images Included within Training Data Set |
| --- | --- | --- | --- |
| TDS_1 | Table | Object _1 | 3 |
| TDS_2 | Dogs | Object _2 | 36 |

In some embodiments, image-capture task subsystem 112, upon accessing training data database 138, may retrieve the index of training data sets and extract the number of images included within each indexed training data set. For example, based on Table 1, image-capture task subsystem 112 may determine that training data set TDS_1 includes three images depicting a table, while training data set TDS_2 includes thirty-six images depicting dogs. In some embodiments, image-capture task subsystem 112 may determine whether the number of images included by a particular training data set satisfies a condition, such as whether the number of images is equal to or greater than a minimum number of images needed for training an object recognition model. In some embodiments, the parameters of a model may be individual weights and biases of the network, and so the number of parameters that a model may have may been in excess of 10,000,000 or more. In some embodiments, the number of parameters may be determined by counting a number of parameters in an embedding layer, a number of edges in a network, a number of layers in the model, or a combination thereof. In some embodiments, to train an object recognition model, a number of images to be included in a training data set may be equal to 1,000 or more images per object class. Still further, some embodiments may include training a model to determine an amount of data needed based on an accuracy or performance of the model. For example, a model that performs poorly (e.g., is not accurate) may require additional data to train the model to obtain improved results. In some embodiments, for a given set of images mapped to an embedding space, a density of a cluster in the embedding space may be used to determine whether additional data is needed for a training data set. For instance, a very dense cluster may indicate a large number of images mapped to a small radius within the embedding space, whereas a sparse data set (e.g., including a limited number of images of a particular category) may be less dense, generally or at a particular region of the cluster, indicating that more images are needed to fill in the gaps that exist in the cluster. In some embodiments, cluster separation may also serve as an indicator of whether additional images are needed for a training data set. For example, if the clusters overlap or are otherwise not well separable, and by clusters this refers to the clustering of given object in the embedding space, this may indicate that additional training data may be needed. Additionally clustering techniques may also be employed. In some embodiments, a clustering quality may be determined using a clustering metric, such as an F1 score, a Normalized Mutual Information (NMI) score, or the Mathews Correlation Coefficient (MCC). For example, for MCC, a value of 0 may be obtained if a maximum-likelihood function or random choice function were used, a value of 1 indicates a perfect score, and a value of −1 is always incorrect. A threshold for determining whether a model includes enough training data may be if the MCC score may be a value selected from a range of values between 0.1 and 0.9. For example, a threshold value may be 0.8, which may indicate that a training data set includes enough data for a model to product accurate results.

In some embodiments, image-capture task subsystem 112 may determine whether any training data sets lack images depicting an object in a particular orientation. Each training data set may include images of a particular object (e.g., a drill, a shirt, a table, etc.), and each image may depict that object from a similar or different perspective, having a similar or different context (e.g., lighting condition, background, orientation, etc.), or a combination thereof. For example, a training data set may include two images of a drill, where each image depicts the drill from a same perspective (e.g., head-on). In this example, the training data set may benefit from additional images depicting the drill from different perspectives (e.g., side profiles, top view, bottom view, etc.). As another example, the training data set may include two images of a drill, each from different perspectives but both having a plain white background. In this example, the training data set may benefit from additional images depicting the drill in different background settings (e.g., in a garage, held in a human hand, with other tools, etc.). As still yet another example, the training data set may include two images of a drill, however both images may include very dark lighting conditions. In this example, the training data set may benefit from additional images depicting the drill in different ambient lighting conditions (e.g., via sunlight, bright store lights, etc.). Some embodiments may include image-capture task subsystem 112 determining whether the number of images of the object satisfies a second condition, where the second condition indicates whether a given training data set includes a threshold number of images depicting an object from different perspectives and contexts (e.g., lighting conditions, backgrounds). For example, a training data set including images of tables may include a large number of images (e.g., 10 or more, 20 or more, 100 or more, etc.) of the object, but all of the images depict the object from a same perspective. As another example, the training data set may include a large number of images depicting a table from different perspectives, but not many (e.g., less than 10, less than 5, less than 2) images depicting the table in different background settings. Therefore, image-capture task subsystem 112 may determine, based on the number of images included with each training data set, and the number of images of an object depicted in each orientation, whether the training data set needs to be supplemented with additional images. Furthermore, image-capture task subsystem 112 may determine, for example, a number of images to be obtained, and the different perspectives, lighting conditions, and background settings those images should be obtained with for updating the training data set. Additionally, image-capture task subsystem 112 may determine whether images depicting variations of an object are needed or missing from a training data set. For example, image-capture task subsystem 112 may determine that a training data set depicting a long-sleeve flannel shirt lacks images depicting the shirt from one or more perspectives, and therefore the image-capture task may be for a user to obtain images of the shirt from the missing perspectives. For example, the training data set may include images of the long-sleeve flannel shirt only in the color red, only in a size large, or only worn by an individual. Therefore, additional images may be obtained of the same long-sleeve flannel shirt but in a different color (e.g., yellow, green), of a different size (e.g., small, medium), or in a different configuration (e.g., draped over a chair, hanging on a hanger, etc.).

Using the aforementioned criteria, image-capture task subsystem 112 may determine which training data sets require additional images, for instance due to a low number of images that the training data set includes, or due to a lack of diversity of those images. Furthermore, some embodiments may include image-capture task subsystem 112 retrieving an indication of the object (e.g., a barcode, a SKU, a QR code, a product name, etc.) with which a user can use to identify the object at a particular location where the object is available. Based on which training data sets require the additional images and the types of images (e.g., different perspectives, lighting conditions, variations, etc.) needed for that training data set, image-capture task subsystem 112 may generate an image-capture task and provide the image-capture task to mobile computing devices 104. Image-capture task subsystem 112 may generate the image-capture task to include a series of sub-tasks representing instructions for how a video recording process is to be performed to obtain the images of the object needed for the training data set. For example, the image-capture task may include instructions indicating how mobile computing device 104 is to be adjusted such that a particular perspective of the object is captured via the video.

In some embodiments, the image-capture task may be executed by a native application of mobile computing device 104, as described in greater detail below with reference to user interface generation subsystem 118. Some embodiments may include image-capture task subsystem 112 generating requests to be embedded in the image-capture task to poll one or more sensors resident on mobile computing device 104. For example, the image-capture task may include requests to obtain IMU sensor readouts. In some embodiments, subsequent the sub-tasks of the image-capture task may be modified based on the information gathered by the sensors. For example, based on the IMU sensor readouts of mobile computing device 104, the image-capture task may provide an indication of one or more actions that a user may take to cause the video recording process to be adjusted, such as moving mobile computing device 104 in a particular manner, changing a filter of the camera used to capture a video, adjusting a lighting of the environment where the video is being captured, change a configuration of the object being captured by the video, etc.

In some embodiments, image-capture task subsystem 112 may generate, output, or generate and output the image-capture task in response to a request for an image-capture task. In some embodiments, the request may be obtained from mobile computing device 104. For example, the request may be obtained in response to a user invoking a native application on mobile computing device 104 indicating that the user is willing to receive an image-capture task. In some embodiments, the user may have pre-registered for receiving image-capture tasks, and computer system 102 may provide an image-capture task to the user via their corresponding mobile computing device 104. In some embodiments, image-capture task subsystem 112 may provide an image-capture task to a user's corresponding mobile computing device 104 in response to determining that mobile computing device 104 satisfies a set of criteria. The set of criteria may include determining that a mobile computing device 104 is within a predefined distance of a facility whereby a particular object is available. In such cases, mobile computing device 104 may be configured to periodically determine a location of mobile computing device 104 and provide the location or a value indicative of the location to computer system 102. For example, mobile computing device 104 may periodically (e.g., ever minute, every five minutes, every 10 minutes, hourly, etc.) poll a location sensor or sensors (e.g., a GPS sensor) to determine a geographical location of mobile computing device 104. In some embodiments, image-capture task subsystem 112 may obtain location data indicating a location of mobile computing device (e.g., from an automated periodic polling of a location of mobile computing device 104, an invocation of a native application using mobile computing device 104, etc.), and based on the location data, image-capture task subsystem 112 may query training data database 138 to identify which object or objects additional training data is needed. Based on the object or objects identified as needed additional training data, image-capture task subsystem 112 may query inventory database 132 to determine object location information. For instance, the object location information may include facilities (e.g., brick and mortar stores, public spaces, etc.) where the object or objects are accessible (e.g., capable of having a video captured of the object or objects, purchasable, etc.). For example, in response to determining that a training data set for training an object recognition model to recognize a particular drill needs, or would benefit from having, additional images depicting the drill (e.g., additional images from various perspectives, lighting conditions, background settings configurations, etc.), image-capture task subsystem 112 may query inventory database 132 to determine a location of a facility where the drill is available for purchase. In response to receiving the location data of mobile computing device 104, image-capture task subsystem 112 may determine whether the location of mobile computing device 104 is within a predefined distance of the location of the facility (e.g., within 1 kilometer of the facility, within 100 meters of the facility, within 10 meters of the facility, etc.). If so, image-capture task subsystem 112 may generate or otherwise obtain (if already generated) the image-capture task and provide the image-capture task to mobile computing device 104. In some embodiments, computer system 102 may access additional information related to a user operating mobile computing device 104, such as a calendar for the user, a search or activity history for the user, social media network connections of the user, and the like, to determine whether the user (and thus their mobile computing device 104) is expected to be near a facility where the object is located. If so, image-capture task subsystem 112 may be configured to provide the image-capture task to mobile computing device 104 prior to the user being within the predefined distance of the facility or upon determining that the user has entered the facility (e.g., based on the GPS location of mobile computing device 104, mobile computing device 104 accessing a Wi-Fi network of the facility, etc.).

In some embodiments, video analysis subsystem 114 may be configured to obtain a candidate video captured via mobile computing device 104 performing the image-capture task. Upon the image-capture task being provided to mobile computing device 104, mobile computing device 104 may be configured to begin obtaining a candidate video depicting an object. In some embodiments, prior to beginning the video recording process, the image-capture task may provide an indication of the object to be captured by the video. For example, the image-capture task may indicate name of the object, a barcode of the object, a SKU of the object, or a combination thereof, and may cause mobile computing device to input or otherwise provide the indication of the object prior to the video recording process beginning. As an example, the image-capture task may provide an indication of a barcode of a drill to be captured by the video, and may cause mobile computing device 104 to take an image of the barcode of the drill, which may be used to verify—either locally by mobile computing device 104 or remotely via a remote server system 110—that the drill is the object to be captured by the video. After confirming the object, the image-capture task may access an image capture component of mobile computing device 104 (e.g., a camera), which may be integrated into the design of mobile computing device 104, communicatively coupled to mobile computing device 104, or both. In some embodiments, the image-capture task may present instructions regarding how the video of the object is to be captured via a native application executing on mobile computing device 104. The native application may cause the image capture component to activate to begin the video recording process, which may begin capturing candidate video immediately or upon a user pressing a button (physical or virtual).

Some embodiments may include the candidate video obtained by mobile computing device 104 depicting the object from multiple perspectives, with multiple lighting conditions, with multiple backgrounds, and having multiple configurations. For example, the candidate video may include video of depicting the object from a first perspective (e.g., head-on) for a first amount of time (e.g., four seconds), followed by video depicting the object from a second perspective (e.g., a side view) for a second amount of time (e.g., five seconds). Mobile computing device 104 may be configured to continually obtain the video for a predefined amount of time (e.g., 10 seconds, 30 seconds, 1 minute, etc.), until a threshold number of images are obtained (e.g., 10 or more images, 20 or more images, 50 or more images), until images captured by the video satisfy a threshold number of criteria (e.g., a threshold number of perspective views of the object are obtained, a threshold number of lighting conditions are obtained, etc.), or a combination thereof. In some embodiments, mobile computing device 104 may be configured to stream the captured video to computer system 102 as the video is being captured. In some embodiments, mobile computing device 104 may be configured to provide the captured video to computer system 102 after the video has been captured.

In some embodiments, mobile computing device 104, computer system 102, or both mobile computing device 104 and computer system 102 may be configured to perform pre-processing on the captured video while the video is being captured, as well as analyze the video while the video is being captured. Additionally, or alternatively, mobile computing device 104, computer system 102, or both mobile computing device 104 and computer system 102 may be configured to perform pre-processing on the captured video and analysis of the captured video after the video recording process has ended.

In some embodiments, video analysis subsystem 114 may be configured to determine a context of the image, an object or objects depicted within the image, or any other aspect of an image, or any combination thereof, using a convolutional neural network (CNN), a discriminative neural network, a region-based CNN (R—CNN), a Fast R—CNN, a Masked R—CNN, Single Shot Multibox (SSD), and a You-Only-Look-Once (YOLO) model, or any other type of machine learning model, or any combination thereof, such as the machine learning models mentioned herein. In some embodiments, the CNN or other machine learning model may be implemented using server-side programming architecture, such as Python, Keras, and the like, or they may be implanted using client-side programming architecture, such as TensorFlow Lite or TensorRT.

In some embodiments, the subset of frames may be extracted from the candidate video while the candidate video is being obtained. As described herein, the "candidate video" may include a portion of the video captured by mobile computing device 104 while the video recording process continues. As described herein also, the "candidate video" may refer to the complete video recording capture by mobile computing device 104. For example, the candidate video may be analyzed in real-time while the video recording process is ongoing. In this example, the candidate video that is analyzed corresponds to a portion of the entire candidate video.

In some embodiments, video analysis subsystem 114 may be configured to extract a subset of frames from the candidate video. The subset of frames may be extracted from the candidate video while the candidate video is being obtained. In some embodiments, a portion of the candidate video may be split into a plurality of frames, where each frame represents a temporal interval defined by a frame rate that the candidate video is sub-sampled at (e.g., 60 fps, 100 fps, 200 fps, etc.) Based on the subset of frames, video analysis subsystem 114 may be configured to determine whether the object (e.g., a target object specified by the image-capture task) has been captured within any of the subset of frames. In some embodiments, video analysis subsystem 114 may include a lightweight object recognition model configured to perform binary classifications of the image as including the object or not including the object. For example, video analysis subsystem 114 may include a mini-classifier trained to identify the object within an image, and may output information indicating whether a given frame from the subset of frames includes the object, a location of the object within the image (e.g., in pixel-space), and other metadata related to the frame (e.g., a pose of the camera, ambient lighting conditions, etc.). Some embodiments of video analysis subsystem 114 include image enhancement techniques capable of being applied to some or all of the subsets of frames from the video. For instance, one or more filters may be applied to a frame to increase clarity, a region of interest may be identified and a bounding box overlaid on the image representing the region of interest, color enhancement, noise removal, de-blurring, or any other image enhancement technique, or any combination thereof.

In some embodiments, video analysis subsystem 114 may be configured to determine whether the object, if identified within one or more frames of the extracted subset of frames, with or without image enhancement, is depicted in a manner lacking from the training data set. For example, the image-capture task may have been generated because images of an object from a particular perspective (e.g., side view) were lacking from that object's corresponding training data set. If one of the frames of the subset of frames extracted from the candidate video is determined to depict the object from the perspective absent from the training data set (e.g., a side view), then video analysis subsystem 114 may generate an indication for the image capture task that a missing perspective view of the object has been obtained and can be added to the training data set. For example, video analysis subsystem 114 may generate an indication that a desired image of the object has been captured and may provide the indication to image-capture task subsystem 112, mobile computing device 104 executing the image-capture task, or both, to indicate that mobile computing device 104 may be adjusted such that another image capturing the object in another desired perspective, lighting condition, background setting, configuration, or a combination thereof, may be obtained.

In some embodiments, video analysis subsystem 114 may be configured to augment a frame determined to include an object (e.g., an object specified by the image-capture task) prior to being added to a training data set. For example, if a frame is determined to include the object at a desired perspective, lighting condition, background, etc., then the frame may be cropped so as to reduce an amount of unneeded data. As another example, a region of interest including the object may identified, and portions of the frame outside the region of interest may be compressed to a lower resolution to converse memory requirements for storing the image, or for performing additional analysis of the image prior to being added to the training data set. In some embodiments, some or all of the functionality of video analysis subsystem 114 may be offloaded to mobile computing device 104 so as to determine, in real-time, whether the candidate video captured the object. In some cases, where some of the functionality of video analysis subsystem 114 is offloaded to mobile computing device 104, the file size savings obtained by some of the aforementioned frame augmentation schemes may achieve less latency in transmitting image data from mobile computing device 104 to remote server system 110.

In some embodiments, video analysis subsystem 114 may be configured to identify a salient frame from a subset of frames of the candidate video. In some embodiments, video analysis subsystem 114 may extract features from one or more frames of the subset of frames from the candidate video. Features that may be extracted include, but are not limited to, colors, shapes, textures, patterns, edges, corners, blobs, regions of interests, and the like. To extract features, various different feature extraction techniques may be used include, but not limited to, principal component analysis (PCA), independent component analysis (ICA), linear discriminant analysis (LDA), locally linear embedding (LLE), t-distributed stochastic neighbor embedding (t-SNE), and autoencoders (denoising autoencoders, variational autoencoders, convolutional autoencoders, sparse autoencoders). Generally, feature extraction causes raw input data (e.g., image data representing an image (one of the frames) depicting an object) to be transformed into a set of features describing the image, which may be used for modeling. In some embodiments, the feature extraction models used to extract features for a given image may output a vector in a continuous feature space, where each element of the vector has a weight determined by the model for the input image. In some embodiments, the feature extraction model may be a pre-trained model, such as ResNet, AlexNet, GoogLeNet, or VGG-19. Each pre-trained model may be trained based on a large number of training images (e.g., 100,000 or more, 1,000,000 or more, 10,000,000 or more) classified into one of a large number of categories (e.g., 100 or more, 1,000 or more, 10,000 or more).

In some embodiments, the feature vectors may be mapped to an embedding space, which is able to represent discrete variables as continuous vectors (in the embedding space). By mapping the feature vectors to the embedding space, clusters may be formed where each cluster represents a different focus of the candidate video. In some embodiments, a salient frame may be determined for each of the clusters. For example, if the image-capture task included capturing video of two different objects, then the embedding space formed by mapping feature vectors representing features extracted from the video's frames would include two clusters: one for each of the two objects. In some embodiments, a similar approach may be applied with a single object, where each cluster may represent a different perspective, lighting condition, background, configuration, etc., of the object captured via the video.

An analysis of a candidate video captured by mobile computing device 104 may include computations of one or more metrics to determine whether a salient frame depicting the object has been obtained. In some embodiments, video analysis subsystem 114 may obtain the candidate video while the candidate video is being obtained, and may extract K salient frames from the video. As mentioned above, each of the K salient frames may correspond to a single object, a different perspective or configuration of one object, or a combination thereof. For example, if the image-capture task relates to obtaining images depicting an object from multiple perspectives (e.g., to complete a training data set missing images of the object from multiple perspectives), then the K salient frames may each correspond to the object depicted in one of the perspectives. As another example, if the image-capture task relates to obtaining images depicting multiple objects, then each of the K salient frames may correspond to one of the multiple objects.

In some embodiments, upon receiving some or all of the candidate video of the object, video analysis subsystem 114 may perform some initial processing to the video. For example, the candidate video (e.g., a portion of the candidate video streamed in real-time or the entire candidate video) may be pruned at the beginning and end in order to remove irrelevant frames. For instance, upon initiating a video recording process, the first one to two seconds and the last one to two seconds may not capture the desired target, but instead may include images of a user moving the camera in a direction of the object or the user pressing a button to cause the video recording to begin or stop. Some embodiments may thus remove an initial few frames (e.g., one second of video) and a final few frames (e.g., one second of video) from the candidate video, and the remaining frames of the video may be used for video analysis.

In some embodiments, video analysis subsystem 114 may be configured to split a candidate video in a plurality of frames. For example, the video may be split into 30 frames per second, 60 frames per second, 100 frames per second, and so on. Each frame may then be analyzed using one or more video metrics, which may be retrieved from video metric database 134. For example, video metric database 134 may store metrics related to computing a Blur score for each frame, a local outlier factor for each frame, or any other video metric, or any combination thereof. In some embodiments, the Blur score may indicate an amount of "blurring" captured within a given frame. A frame that includes a large amount of blurring may not provide an accurate depiction of the object, and therefore may degrade the quality of the training data used to train an object recognition model. In some embodiments, the Blur score for a frame may be computed by convolving the frame with a Laplacian kernel, computing the variance of the resulting convolution, and determining whether the variance is less than a predefined threshold. For example, each frame may be convolved with a 2D Laplacian 3×3 kernel.

Some embodiments may compute a Fast Fourier Transform of the image and determine whether an aggregate (like average) amplitude of frequencies below a threshold frequency exceed a threshold amplitude, thereby potentially indicating a blurry image exhibiting a large amount of low-frequency variation in pixel intensity in pixel space. Some embodiments may score images for blur based on variation of a Laplacian. For example, some embodiments may convolve a Laplacian kernel (e.g., a kernel where row 1=[0,1,0]; row 2=[1,−4,1], and row 3=[0,1,0]) with the image (like a channel thereof, such as a greyscale channel). The convolution may compute second order derivatives of pixel intensity with respect to location in pixel space in a single pass and, as a result, may be relatively computationally efficient relative to other approaches. Some embodiments may then determine a measure of variance, like standard deviation or range (or other population statistics, like kurtosis), of an output of the convolution to produce a blur score for the image. Some embodiments may classify the image as blurry in response to determining the blur score is less than a threshold value, and vice versa in response to exceeding the threshold.

The threshold for the blur score may initially set at a value of 100, however alternative thresholds may be used (e.g., 50, 75, 150, 200, etc.). The result of the aforementioned process may be an indication of each image that has a blur score less than the defined threshold. These images may be removed from consideration as being the salient frame, and the remaining images can be further analyzed. In some embodiments, the aforementioned process computes the blur score along a single channel, (e.g., greyscale). Alternatively, the blur score along other channels (e.g., red, blue green) may be computed, and the aforementioned process is merely an illustration of one channel.

In some embodiments, embeddings for each of the plurality of frames may be extracted using a pre-trained deep learning network. In some embodiments, the pre-trained deep learning network may include a deep neural network having a large number of layers. For example, the deep neural network may include six or more layers. Video analysis subsystem 114 may be configured to obtain the pre-trained deep learning network from model database 140. The pre-trained deep learning network may include a number of stacked neural networks each of which includes several layers. As mentioned previously, the embeddings may refer to a higher dimension representation of a discrete variable where the number of dimensions is less than, for example, a number of pixels of an input image. Using the pre-trained deep learning network, video analysis subsystem 114 may be configured to extract an embedding for each frame of the plurality of frames obtained from the candidate video. The embedding may be a representation of an object depicted by an image (e.g., a drill to be exactly matched). The embeddings may be generated using different models for aspects such as color, pattern, or other aspects. For example, a model may extract a color embedding that identifies a color of the object within an image. In some embodiments, the embedding may be extracted using a last, or second to last, layer of a network. The network may be configured to extract an embedding for each image input to the network. The embedding may be represented as a tensor. For example, an embedding tensor of rank 1 may refer to an embedding vector composed of an array of numbers (e.g., a 1 by N or N by 1 vector). The dimensionality of an embedding vector may vary depending on use case, for instance the embedding vector may be 32 numbers long, 64 numbers long, 128 numbers long, 256 numbers long, 1024 numbers long, 1792 numbers long, etc. The embeddings mapped to an embedding space may describe a relationship between two images. As an example, a video depicting a drill split into 20 frames may produce 20 vectors that are spatially close to one another in the embedding space because each frame depicts a same drill. An embedding space is specific to a model that generates the vectors for that embedding space. For example, a model that is trained to produce color embeddings would refer to a different embedding space that is unrelated to an embedding space produced by an object recognition model (e.g., each embedding space is independent form one another). In some embodiments, the spatial relationship between two (or more) embedding vectors in embedding space may provide details regarding a relationship of the corresponding images, particularly for use cases where a training data set includes a sparse amount of data.

In some embodiments, a local outlier factor (LOF) may be computed for all feature embeddings extracted from the candidate video. The LOF refers to a measure for a local deviation of density of a given embedding vector with respect to its neighbors. In the context of the extracted embeddings, the LOF may refer to a measure of a local deviation of an embedding with respect to its k-nearest neighbors. Clusters of embedding vectors having a lower density than their neighbors may be labelled as outliers. For example, an embedding vector that is further from a centroid of a cluster of embedding vectors may be considered an outlier. In some embodiments, the outliers may be removed from further computations to improve accuracy.

Embodiments may cluster vectors in the embedding space with a variety of techniques. Examples include unsupervised approaches like k-means, density-based spatial clustering of applications with noise (DBSCAN), or ordering points to identify the clustering structure (OPTICS). For instance, some embodiments may execute a density-based clustering algorithm to establish groups corresponding to the resulting clusters and in some cases exclude outliers. To cluster according to location in an embedding space, some embodiments may iterate through each of the vectors corresponding to frames and designate a frame vector as a core frame vector if at least a threshold number of the other frame vectors in the records are within a threshold distance in the embedding space. Some embodiments may then iterate through each of the core frame vectors and create a graph of reachable frame vectors, where nodes on the graph are identified in response to non-core corresponding frame vectors being within a threshold distance of a core frame vector in the graph, and in response to core frame vectors in the graph being reachable by other core frame vectors in the graph, where two frame vectors are reachable from one another if there is a path from one frame vector to the other frame vector where every link and the path is a core frame vector and is within a threshold distance of one another. The set of nodes in each resulting graph, in some embodiments, may be designated as a cluster, and points excluded from the graphs may be designated as outliers that do not correspond to clusters. In some embodiments, the resulting clusters may be a local optimum resulting, and different initial conditions (e.g., different initial point selections) may yield better (e.g., with a smaller sum of root-mean-square distances between centroids and vectors) clusters. Accordingly, some embodiments may repeat the clustering process multiple times (e.g., more than five times) with different initial point selections (e.g., different random selections) and select a resulting set of clusters having the best clusters by the aforementioned measure.

In some cases, vectors in the embedding space may be designated as outliers with respect to corresponding clusters (or in some cases, without identifying or referencing corresponding clusters, which is not to suggest that any other feature is not also amenable to variation). In some cases, outliers may include those designated as such in the clustering process, and such outliers may be associated with a cluster having a closest member vector, centroid, or convex hull surface, for instance. In some cases, a second pass of analysis may be performed on each cluster to identify outliers by another form of analysis relative to that used for forming the clusters initially, e.g., a vector within a cluster buy at the edge of its periphery may be designated as an outlier for subsequent purposes in some cases. In some cases, the non-core vectors in the approach above may be designated as outliers of their corresponding respective vectors, or a similar analysis may be performed with a different distance threshold. Some embodiments may execute Unsupervised Outlier Detection using Local Outlier Factor (LOF) to designate outlier frame vectors in the embedding space. For instance, some embodiments may, for each vector, determine whether more than a threshold number of other vectors are within a threshold distance, whether an mean distance to a designated number of other vectors (like a plurality of such vectors) exceeds a threshold.

In some embodiments, the following pseudocode is an example of a process that may be performed by video analysis subsystem 114 to compute the LOF for a set of frames.

1. samples=[[0, 0, 0], [0, 0.5, 0], [1, 1, 0.5]]
2. neigh=NearestNeighbors(n_neighbors=1)
3. neigh.fit(samples)
4. NearestNeighbors(nneighbors=1)
5. print(neigh.kneighbors([[1, 1, 1]]))
6. (array([[0.5]]), array([[2]]))

As seen in the aforementioned example process, for a set of input samples (e.g., vectors {0, 0, 0}, {0, 0.5, 0}, {1, 1, 0.5}) the closest point to the vector {1, 1, 1} is the third vector, {1, 1, 0.5} at a distance of 0.5.

In some embodiments, the LOF for all of the feature embeddings may be used in combination with the blur score computed for each frame to compute a saliency score for each frame. In some embodiments, the saliency score may be computed as a weighted linear combination of the blur score for a given frame and the LOF for the frame. For example, the saliency score, Saliency_Score, may be equal to $Saliency\_Score = W\_1 \times Blur\_i + W\_2 \times LOF\_i$, where i corresponds to a frame extracted from the candidate video, and W_1 and W_2 are weights. Weights W_1 and W_2 may be set initially as having values 0.8 and 0.2, respectively, however these values may be tuned using training data. In some embodiments, the Blur detection may be considered one model, while the LOF may be considered another model. The outputs of these models may be mapped into two different embedding spaces, a determination may be made as to how much information gain is obtained from a new frame based on how the new frame is mapped to each of the embedding spaces.

Some embodiments may include video analysis subsystem 114 computing a saliency score for each frame of the candidate video. The saliency scores may be computed in real-time (e.g., dynamically as the candidate video is being captured) or in bulk (e.g., upon completion of the video recording process). In some embodiments, the saliency score for each frame may be compared with a threshold saliency score, where saliency scores that equal or exceed the threshold saliency score may indicate that the corresponding frame may be used as a salient frame depicting the object. In some embodiments, the threshold saliency score may be set high enough such that, for a given subset of frames, only a few salient frames (e.g., 2-5) are identified so as to prevent oversaturation of the training data for a particular set of criteria (e.g., perspective, lighting, etc.). The salient frames, upon being identified, may then be added to the training data set for the object. For instance, a salient frame may be stored in training data database 138.

In some embodiments, model subsystem 116 may be configured to generate or update one or more training data sets, as well as train, or cause to be trained, one or more models. For example, model subsystem 116 may update a training data set with one or more images representing salient frames extracted from a candidate video of an object, and may use the updated training data set to facilitate the training of an object recognition model for recognizing instances of the object within a new image. In some embodiments, in response to identifying a salient frame from a candidate video (e.g., a portion of a candidate video, an entire candidate video), the salient frame may be stored in memory in association with an object identifier of the object from the object ontology that the candidate video was captured for (e.g., a product identifier of the product that the image-capture task was focused on). In some embodiments, features may be extracted from each salient frame that is identified. For example, the features may be extracted using a deep learning network, such as the deep learning network described above. In some embodiments, the features previously extracted by the deep learning network may be obtained and retained by video analysis subsystem 114 for each of the identified salient frames. The features of these salient frames may then be stored in memory in association with the object identifier of the object from the object ontology. In some embodiments, both the salient frames and the features extracted from the salient frames may be stored in memory in association with the object identifier. The object identifier associated with the images, features, or images and features, may be used to determine which training data set to update. For example, model subsystem 116 may extract the object identifier from the salient frames and query training data database 138 to determine the training data set associated with the object identifier. Based on the object identifier, model subsystem 116 may cause the salient frames to be added to the training data set for that object identifier.

In some embodiments, model subsystem 116 may be configured to train an object recognition model to recognize an object within an image based on a training data set. For example, an object recognition model trained to recognize a drill within an image may be trained using a training data set formed of images of drills from various perspectives, with various lighting conditions, with various backgrounds, or having various configurations (e.g., model, type, color, etc.). In some embodiments, the object recognition model may be stored in model database 140. Upon determining that training data database 138 has been updated, or in response to determining that a training data set stored within training data database 138 has been updated, a corresponding object recognition model may be retrieved from model database 140 by model subsystem 116. The object recognition model may be a specific object recognition model, or the object recognition model may be generic. For example, a specific object recognition model may be configured to recognize instances of a particular object (e.g., a drill, a table, a shirt, etc.) within an image, whereas a generic object recognition model may be configured to recognize various different objects within an image. The training data used to train the specific object recognition model may differ from the training data used to train the generic object recognition model. For instance, the specific object recognition model may be trained using images depicting the specific object, features extracted from the images depicting the specific object, or both the images and the extracted features. On the other hand, the generic object recognition model may be trained using images depicting various objects (e.g., a ball, a computer, a drill, a couch, etc.), features extracted from the images depicting various objects, or both.

Model subsystem 116 may be configured to retrieve the updated training data set and the object recognition model that is to be trained or re-trained based on the updated training data set. In some embodiments, model subsystem 116 may be configured to facilitate the training of the object recognition model. Alternatively, model subsystem 116 may provide the object recognition model and the updated training data set to another computing system for training the model.

In some embodiments, user interface generation subsystem 118 may be configured to generate, update, and output data for rendering of a user interface (UI) on a display screen of mobile computing device 104. In some embodiments, the UI may be rendered within a native application of mobile computing device 104. In some embodiments, the UI may be generated upon receipt of a request for an image-capture task. For example, image-capture task subsystem 112 may determine that an image-capture task should be generated and provided to mobile device 104. The determination may be made based on a determination that an object recognition model lack of a sufficient amount of training data, a determination that mobile device 104 is within a predefined distance of a facility where a particular object is located (e.g., an object that an object recognition model is to be trained to recognize), or receipt of a user input to remote server system 110. In some embodiments, the image-capture task is provided to mobile computing device 104 automatically without a request being received. For example, image-capture task subsystem 112 may generate the image-capture task, provide a notification, such as a link to a downloadable file, an attachment of a downloadable file, or a version update request for the native application, to a user account. Upon accessing the native application via an operating system running on processors of mobile computing device 104, the notification may be presented or otherwise provided to an operating user, and subsequently the image-capture task may be accessible to the user.

Some embodiments include image-capture task subsystem 112 generating computer readable code (e.g., Java, Python, C++) that, when executed, causes the image-capture task to be displayed by the native application. The image-capture task may include a set of sub-tasks representing instructions for how a video of a particular object is to be recorded by mobile computing device 104 to facilitate one or more images depicting the object to be obtained. In some embodiments, the sub-tasks may cause mobile computing device 104 to be adjusted in a manner (e.g., rotated about an axis, moved in a certain direction with respect to the object, etc.) to allow the video to capture the object from a perspective, lighting condition, background setting, configuration, or a combination thereof, which currently is not included within the training data for training an object recognition model to recognize that object. For example, the object recognition model configured to recognize a drill within an image may lack images of that drill from one or more orientations (e.g., side view, top view). The image-capture task, in such an example, may facilitate mobile computing device 104 to move in a manner to allow the camera component to obtain the lacking images. Some embodiments may include continually polling sensor data of sensors resident on mobile computing device 104, and using the output sensor data to determine an action to be performed or caused to be performed by mobile computing device 104. For example, an IMU on mobile computing device 104 may indicate that, based on a current orientation of an object as depicted by an image captured by the camera, mobile computing device 104 should be moved to the right with respect to the object. The IMU may monitor a change in a gravity vector to determine a direction and amount of movement that occurred, and use this information to determine whether the camera is in an accurate position to capture the desired image of the object. Some embodiments may include running a low-weight object detection model via mobile computing device 104 to determine, based on a video stream from a camera component, whether the object has been detected. In some embodiments, the object detection model may compute, in real-time, changes in the positioning of the camera component with respect to the object. For example, if the object detection model determines that the camera component of mobile computing device 104 is orientated "head-on" with respect to the object, the object detection model may be determined that mobile computing device 104 should be moved to a right or left direction to obtain an image depicting the object from a side perspective view.

Upon generating, or updating, the instructions based on the images needed to be captured, user interface generation subsystem 118 may be configured to generate indications of how mobile computing device 104 is to be adjusted. Some embodiments may include generating visual indicators instructing the user operating mobile computing device 104 as to the actions that he/she is to perform. For example, if mobile computing device 104 is to be moved to the right, user interface generation subsystem 118 may generate a visual indicator (e.g., an arrow) pointing in a direction of the user's right.

In some embodiments, user interface generation subsystem 118 may be configured to generate and provide feedback to mobile computing device 104. The feedback may be generated in response to the actions, or lack of actions, performed to mobile computing device 104 based on the image-capture task. Some embodiments may include providing the feedback in real-time such that as the image-capture task presents instructions to the user via mobile computing device 104, the feedback indicates to the user whether a given sub-task or sub-tasks are being performed correctly. In some embodiments, the feedback may be provided with an indication of one or more actions that can be performed to adjust mobile computing device 104 to facilitate capturing an image of an object in a desired manner (e.g., from a certain perspective). For example, the feedback may include a score describing a progress of the user with regard to the image-capture task as well as an indication of how the user can adjust mobile computing device 104 to further improve the score, such as by causing mobile computing device 104 to be moved in a direction to facilitate capturing the video of the object from a new perspective.

Figure 2:
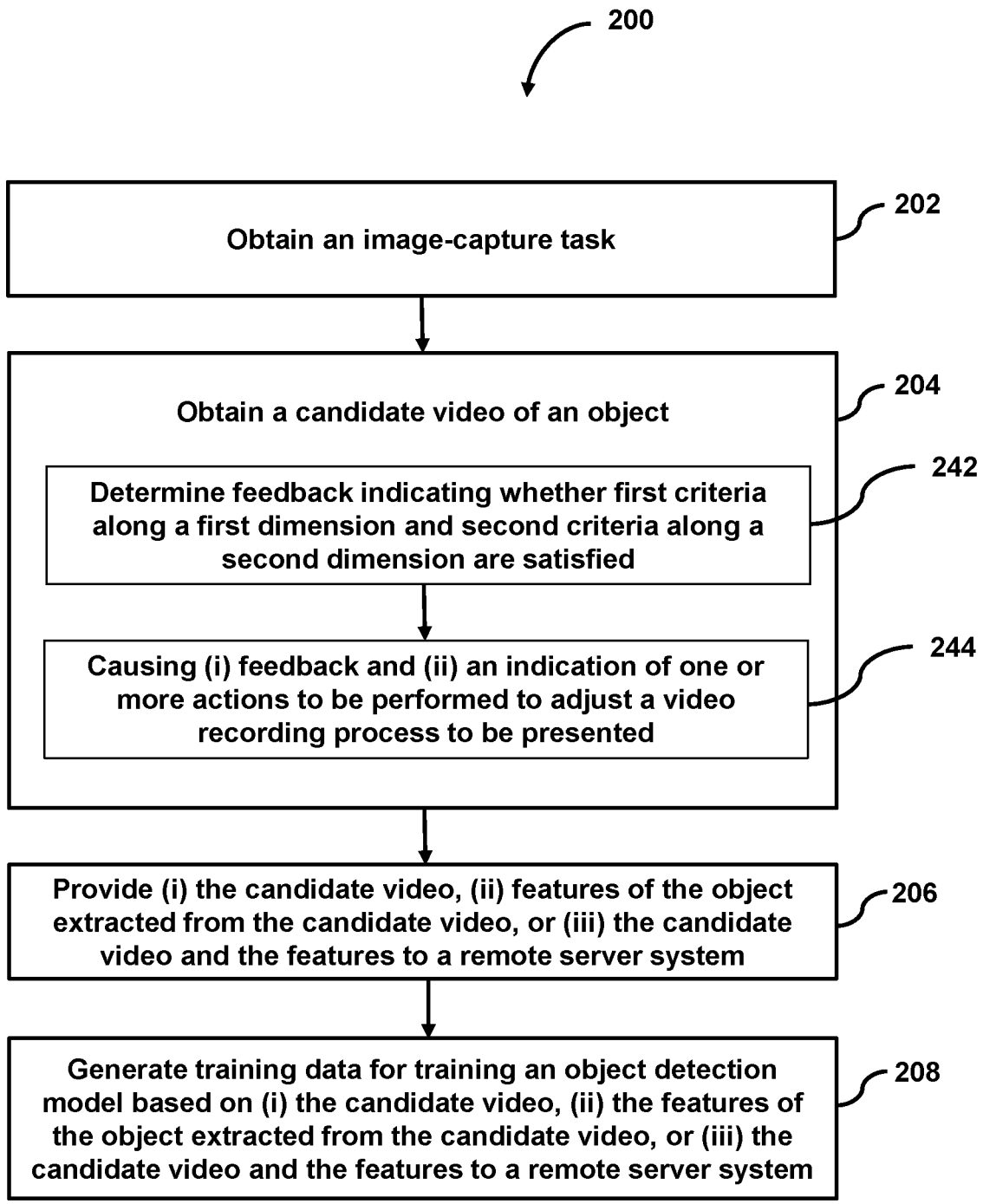
FIG. 2 illustrates an example process for generating training data for training an object recognition model based on an image-capture task, in accordance with various embodiments.

FIG. 2 illustrates an example process for generating training data for training an object recognition model based on an image-capture task, in accordance with various embodiments. In some embodiments, process 200 may begin at step 202. At step 202, an image-capture task may be obtained. The image-capture task may include a request for a video of an object to be captured by a mobile computing device (e.g., mobile computing device 104). For example, a mobile computing device including a camera or other image capturing component, or a mobile computing device that is communicatively coupled to a camera or other image capturing component, may receive the image-capture task requesting that a video of an object be captured. In some embodiments, the image-capture task may be generated by, output from, or both generated by and output from a remote server system. For example, an image-capture task may be generated by computer system 102 (e.g., image-capture task subsystem 112) of remote server system 110. In some embodiments, the image-capture task may provide an indication of the object that is to be captured by the video. For example, the image-capture task may indicate a name of the object to be captured by the video, a barcode of the object, a SKU of the object, a location of the object, descriptors of the object (e.g., size, shape, color, etc.), or any other indication that may help identify the object to a user operating mobile computing device 104. Furthermore, the indication of the object may also be used by remote server system 110, such as by image-capture task subsystem 112, to identify the object to ensure that a video of the correct object is going to be obtained. Some embodiments may include causing an image of the indication of the object to be obtained prior to beginning the image-capture task (e.g., prior to the video recording process beginning). For example, mobile computing device 104 may scan a barcode of an object (e.g., a drill) prior to the video recording process beginning. If the barcode scan indicates that the correct object has been identified, then the image-capture task may cause a video recording functionality of the mobile computing device to activate. In some embodiments, the image-capture task may cause the mobile computing device to present instructions via a native application executing on the mobile computing device, where the instructions that are presented may describe how the video of the object is to be captured. For example, the presented instructions may indicate a pose that the object should have when the video is captured, a pose of the camera when capturing the video of the object, lighting conditions for the environment where the video is being captured, a background setting for the object, and other aspects for the video. In some embodiments, the instructions may indicate ways that the user may adjust mobile computing device 104 to obtain a particular depiction of the object. In some embodiments, step 202 may be performed by a subsystem that is the same or similar to image-capture task subsystem 112.

At step 204, a candidate video of an object may be obtained. In some embodiments, mobile computing device 104 may be configured by the image-capture task to cause a candidate video of the object to be obtained. The candidate video may include the object captured from multiple perspectives, multiple lighting conditions, multiple background settings, multiple configurations, or from any other variant, or any combination thereof. As an example, the candidate video may include capturing video of the object from a front view, a side view, and various views therebetween. For instance, if the front view corresponds to a 0-degree angle between the camera of mobile computing device 104 and a front face of the object, and the side view comprises a 90-degree angle with respect to the camera and the front face, then the candidate video may capture video of the object as mobile computing device traverses the angles from 0-degrees to 90-degrees. As another example, the candidate video may include capturing video of the object in various configurations, such as in different formats, options, formations, etc. For instance, if the object is a flannel shirt, the image-capture task may request that candidate video capture a red version of the flannel shirt, a green version of the flannel shirt, a size large flannel shirt, a size small flannel shirt, the flannel shirt draped over a chair, the flannel shirt hung on a hanger, the flannel shirt worn by a person (or mannequin), and the like. The particular "views" of the object may be specified by the image-capture task, which may be determined based on the images currently stored in a training data set for that object. In some embodiments, image-capture task subsystem 112 may query training data database 138 to determine which training data sets lack enough images or lack enough diversity of images (e.g., only images of the object from a single perspective). If a particular training data set corresponding to an object (e.g., a training data set of images of drills) requires additional images to improve the accuracy of a corresponding object recognition model, then image-capture task subsystem 112 may generate an image-capture task including a sub-set of tasks that facilitate capturing video of the object in some or all of the needed formats.

In some embodiments, step 204 may include a sub-step 242. Sub-step 242 may include determining feedback indicating whether first criteria along a first dimension are satisfied, whether second criteria along a second dimension are satisfied, or both. In some examples, a dimension may refer to a perspective of the object and the corresponding criteria may include multiple perspectives of the object that are to be obtained via the candidate video. In some examples, the dimension may refer to a lighting condition of the object (e.g., ambient light level of the environment where the object is located and the candidate video is captured), and the corresponding criteria may include multiple lighting conditions that the object is to be captured within an image. In some examples, the dimension may refer to a background setting of the object, and the corresponding criteria may include various background settings that the object is to be placed (e.g., a plain white background, a blue sky background, a garage background, etc.). In some examples, the dimensions may refer to configurations of the object, and the corresponding criteria may include various configurations of the object that the candidate video is to obtain (e.g., different colors of the object, different sizes of the object, different formations of the object, different placements of the object, etc.).

In some embodiments, sub-step 242 may be computed in real-time while the candidate video is being recorded. For example, as the candidate video is being captured, video analysis subsystem 114 may determine whether the first and second criteria along the first and second dimensions, respectively, are being satisfied. If so, image-capture task subsystem 112 may generate feedback regarding the performance of the user while capturing the video. For example, the feedback may include a score indicating an accuracy or progression of the user through the image-capture task (e.g., 50% complete, 75% complete, 3 images remaining, etc.). As another example, the feedback may include words, phrases, images, or a combination thereof, that indicate to the user how he/she is progressing through the image-capture task (e.g., "Good job!", "Keep up the good work," etc.).

Step 204 may also include a sub-step 244. At sub-step 244, the feedback determined at sub-step 242, as well as an indication of one or more actions to be performed to adjust a video recording process, may be caused to be presented. For instance, the feedback and the indication of the one or more actions may be caused to be presented within a user interface of a native application executing on mobile computing device 104. In some embodiments, the feedback and the indication of the one or more actions may be presented while the candidate video is still being captured. For example, the captured candidate video may be streamed to remote server system 110, and video analysis subsystem 114 of computer system 102 may analyze some of the candidate video while additional portions of the candidate video is obtained. The feedback and indications may be dynamic and provided in real-time based on the portion or portions of the candidate video capture by mobile computing device 104 and streamed to remote server system 110. In some embodiments, the indications of the one or more actions may include graphical representation presented via the native application's UI indicating how a user should adjust the video recording process. For example, the indication of the one or more actions may include information describing how a user may adjust an orientation, position, or location of mobile computing device 104 to obtain an image depicting the object in a particular manner. As an example, the indication may include a graphical representation of an arrow pointed towards a right-side of mobile computing device 104 indicating that a user should move mobile computing device 104 in that direction. As another example, the indication may include a graphical representation of a word or phrase, or a visual indication of a level, allowing the user to adjust mobile computing device 104 to have a different device orientation. In some embodiments, step 204, including sub-steps 242 and 244, may be performed by a subsystem or combination of subsystems that are the same or similar to video analysis subsystem 114 and user interface generation subsystem 118.

At step 206, the candidate video, features of the object extracted from the candidate video, or the candidate video and the features extracted from the candidate video, may be provided to a remote server system. In some embodiments, the candidate video may be provided to remote server system 110 in response to determining that one or more salient images of the object have been obtained. The salient image or images may be detected by splitting the candidate video into a plurality of frames, and then computing a saliency score for each frame. In some embodiments, the salient frame or frames may be a frame that's saliency score satisfies a saliency threshold condition (e.g., is greater than or equal to a saliency threshold score). In some embodiments, the salient frames may be provided to training data database 138 and added to a training data set of a corresponding object. In some embodiments, features may be extracted from the salient frame using a deep learning network. For example, a feature vector representing discrete variable from the salient frame may be generated using the deep learning network. Some embodiments may include storing the features of the salient frame with the training data set for the object in addition to, or instead of, the salient image. In some embodiments, step 206 may be performed by a subsystem or combination of subsystems that are the same or similar to video analysis subsystem 114 and model subsystem 116.

At step 208, training data may generated for training an object detection model based on the candidate video, the features extracted from the candidate video, or the candidate video and the features extracted from the candidate video. As mentioned previously, the candidate video, the features extracted from the candidate video, or both, may be provided to remote server system 110. In some embodiments, the training data set for the corresponding object depicted by the candidate video may be determined based on an object identifier associated with the object. In some embodiments, the object identifier may be determined based on the indication of the object provided by the image-capture task. For example, upon providing the image-capture task to mobile computing device 104, an input representing the indication of the object may be provided to mobile computing device 104 (e.g., a barcode scanned). Based on the indication, a determination may be made as to whether the object was correctly identified by a user operating mobile computing device 104. If so, image-capture task subsystem 112 may obtain an object identifier of the object from an object ontology including a plurality of objects. The object identifier may include a multi-character string uniquely identifying the object within the object ontology. In some embodiments, the candidate video, features, or both, may be appended to include the object identifier. In some embodiments, model subsystem 116 may determine a training data set that is to be generated or updated with the candidate video, the features extracted, or both, based on the object identifier. Upon locating the object identifier, for example using an index of training data sets stored within training data database 138, model subsystem 116 may provide the candidate video, features, or both to the training data set associated with the unique object identifier, adding the video, frames from the video, the features extracted from the frames, or a combination thereof, to the training data set. Subsequently, model subsystem 116 may be configured to train, or cause to be trained, an object recognition model used to recognize objects that are the same or similar to the object associated with the object identifier. For example, model subsystem 116 may update a training data set including images of drills, and may provide the updated training data set to an object recognition model configured to recognize instances of a drill within an image to cause the object recognition model to be re-trained. In some embodiments, step 208 may be performed by a subsystem that is the same or similar to model subsystem 116.

Figure 3:
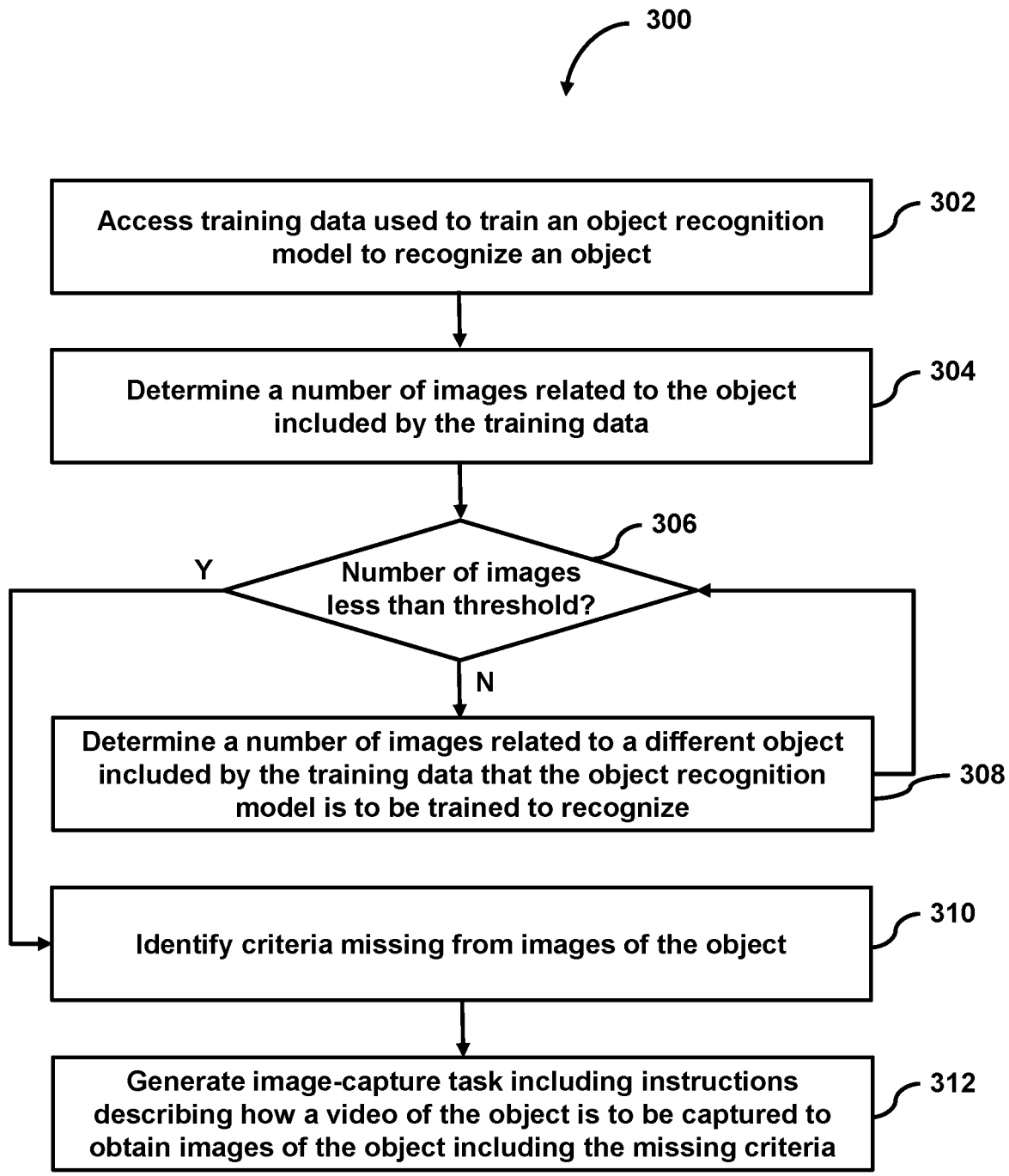
FIG. 3 illustrates an example process for generating an image-capture task based on a determination of whether a training data set includes a requisite amount and diversity of images, in accordance with various embodiments.

FIG. 3 illustrates an example process for generating an image-capture task based on a determination of whether a training data set includes a requisite amount and diversity of images, in accordance with various embodiments. In some embodiments, process 300 may begin at step 302. At step 302, training data used to train an object recognition model to recognize an object may be access. In some embodiments, the training data stored in training data database 138 may be accessed. As an example, with reference to Table 1, training data database 138 may include an index that includes a listing of each training data set stored within training data database 138, a name of the object that the training data set corresponds to, an object identifier of the object, and a number of images that the training data set includes. In some embodiments, step 302 may be performed by a subsystem that is the same or similar to image-capture task subsystem 112.

At step 304, a number of images related to the object that are included by the training data set for the object may be determined. In some embodiments, the index including the listing of each training data stored in training data database 138 may be queried to determine which training data sets lack enough images to train a corresponding object recognition model, which training data sets lack enough diversity of images to train a corresponding object recognition model, which training data sets have not been updated recently (e.g., no updates within a most recent 1 or more months, 3 or more months, 6 or more months, 12 or more months, etc.), or a combination thereof. In some embodiments, a training data set used to train a corresponding object recognition model having p parameters should include $\alpha \cdot p$ samples in order to ensure accuracy. The multiplier a may be any real, rational, number, such as, 1, 2, 3, 5, 10, 20, etc. As a general consideration, the more training data a training data set includes, the more accurate the object recognition model should be.

In some embodiments, the number of images related to the object in a particular training data set may be determined by querying the index of training data from training data database 138. For example, with reference to Table 1 above, training data set TDS_1 includes 3 images depicting a table (e.g., the object), while training data set TDS_2 includes 36 images depicting dogs. In some embodiments, the index may include information regarding the various different images included within a given training data set. For example, the information may indicate how many images of a particular object the training data set includes, and of those images, how many depict the object from a different perspective (e.g., front view, side view, top view, etc.), how many depict the object with different lighting conditions (e.g., ambient light levels of 500-1,000 lux; outdoor light levels of 10,000 lux, etc.), how many depict the object with a different background setting (e.g., a plain white background, a blue sky background, etc.), and how many depict the object in a particular configuration (e.g., different colors, different positions or settings of object, etc.). In some embodiments, a training data set may include a large quantity of images depicting the object (e.g., 100 or more, 1,000 or more, 10,000 or more), however those images may not differ much in characterizing the object. Therefore, additional images of the object in different perspectives, lightings, background, configurations, or in any other manner, or any combination thereof, may improve accuracy of an object recognition model trained with the training data. In some embodiments, step 304 may be performed by a subsystem that is the same or similar to image-capture task subsystem 112.

At step 306, a determination may be made as to whether the number of images determined at step 304 is less than a threshold value. The threshold value may represent a total number of images depicting an object that the training data set is to include. For example, the threshold value may be 10 or more total images, 100 or more total images, 1,000 or more total images, and the like. Alternatively or additionally, the threshold value may represent a number of images depicting the object of a different format the training data set includes. For example, the threshold value may be 1 or more images depicting the object from A different perspectives, 1 or more images depicting the object with B different ambient light levels, 1 or more images depicting the object with C different backgrounds, 1 or more images depicting the object having D different configurations, and the like, where A, B, C, and D are real, rational numbers (e.g., A, B, C, D selected from a set of numbers between 1-100).

In some embodiments, measures may be computed to determine whether additional data is needed for a training data set. For example, a performance of a model, such as its accuracy, may be computed. Various metrics for computing accuracy may include, but are not limited to, an F1 score, a Type 1 or Type 2 error, NMI score, or MCC score. For example, for MCC, a threshold may be selected within a range of 0.1 to 0.9. For instance, for a threshold of 0.8, if the MCC score is less than 0.8, then additional training data may be needed to improve the model's accuracy. As another example, a density of clusters of embedding vectors produced by the network may be analyzed. If the density includes large gaps, then this may indicate that additional data should be added to the training data for the model to fill in the missing gaps. In particular, based on the location of these gaps in the embedding space, a determination may be made as to what data should be obtained (e.g., added to the training data).

If, at step 306, it is determined that the number of images in the training data set is not less than the threshold value, then process 300 may proceed to step 308. At step 308, a number of images related to a different object included by the training data that the object recognition model is to be trained to recognize is determined. Process 300 may then return to step 306 to determine if the number of images of the different object is less than the threshold value. In some embodiments, if the object recognition model is specific and is only used to recognize one object or one type of object, then process 300 may end after step 306. However, if the object recognition model is generic, capable of recognizing at least two different objects or two different types of objects, then process 300 may proceed to step 308. In some embodiments, steps 306 and 308 may be performed by a subsystem that is the same or similar to image-capture task subsystem 112.

In some embodiments, the training data set may be determined to include a satisfactory number of images if the total number of images is greater than the threshold value (e.g., a training data set including 1,000,000 images, where the threshold value is 10,000 images). In some embodiments, the training data set may be determined to include a satisfactory number of images if the training data set includes a first number of images depicting the object from A or more different perspectives, a second number of images depicting the object with B different ambient light levels, a third number of images depicting the object with C different backgrounds, a fourth number of images depicting the object having D different configurations, or a combination thereof. As an example, a training data set including 1,000,000 images depicting a drill may be determined to have more than the threshold number of images. For instance, the training data set may include 1,000,000 images depicting a drill, where at least 100 images depict the drill from a different perspective (e.g., 0-degrees with respect to a front face of the object, 180-degrees with respect to the front face of the object, etc.), at least 100 images depict the drill with a different lighting condition (e.g., with 100 different lux values), at least 100 images depicting the drill with a different background (e.g., plain white background, blue sky background, etc.), and at least 100 images depicting the drill having a different configuration (e.g., different color, different model, different drill bit attachment, etc.). If the threshold value is 10,000 images of a drill, then because the training data set includes 1,000,000 images depicting the drill, this threshold value criteria may be satisfied.

If the number of images is determined to be less than the threshold value, then process 300 may proceed to step 310. At step 310, criteria missing from the images of the object (e.g., from the training data set) may be identified. In some embodiments, the criteria may correspond to one or more dimensions, such as, and without limitation, a perspective, a lighting condition, a background setting, a configuration, or any other manner that the object may be depicted by, or any combination thereof. If step 306 determined that less than a threshold value of images were included by a training data set, where the threshold value may be criteria along one or more dimensions, then at step 308, the dimensions with which a number of images do not satisfy the criteria may be identified. In some embodiments, step 308 may be performed by a subsystem that is the same or similar to image-capture task subsystem 112.

At step 312, an image-capture task may be generated, where the image-capture task includes instructions describing how a video of the object is to be captured to obtain images of the object including the missing criteria. For example, if images from different or a specific number of perspectives are missing from a training data set, then the image-capture task may include instructions for how mobile computing device 104 can be positioned with respect to the object to obtain those images. In some embodiments, step 310 may be performed by a subsystem that is the same or similar to image-capture task subsystem 112.

Figure 4:
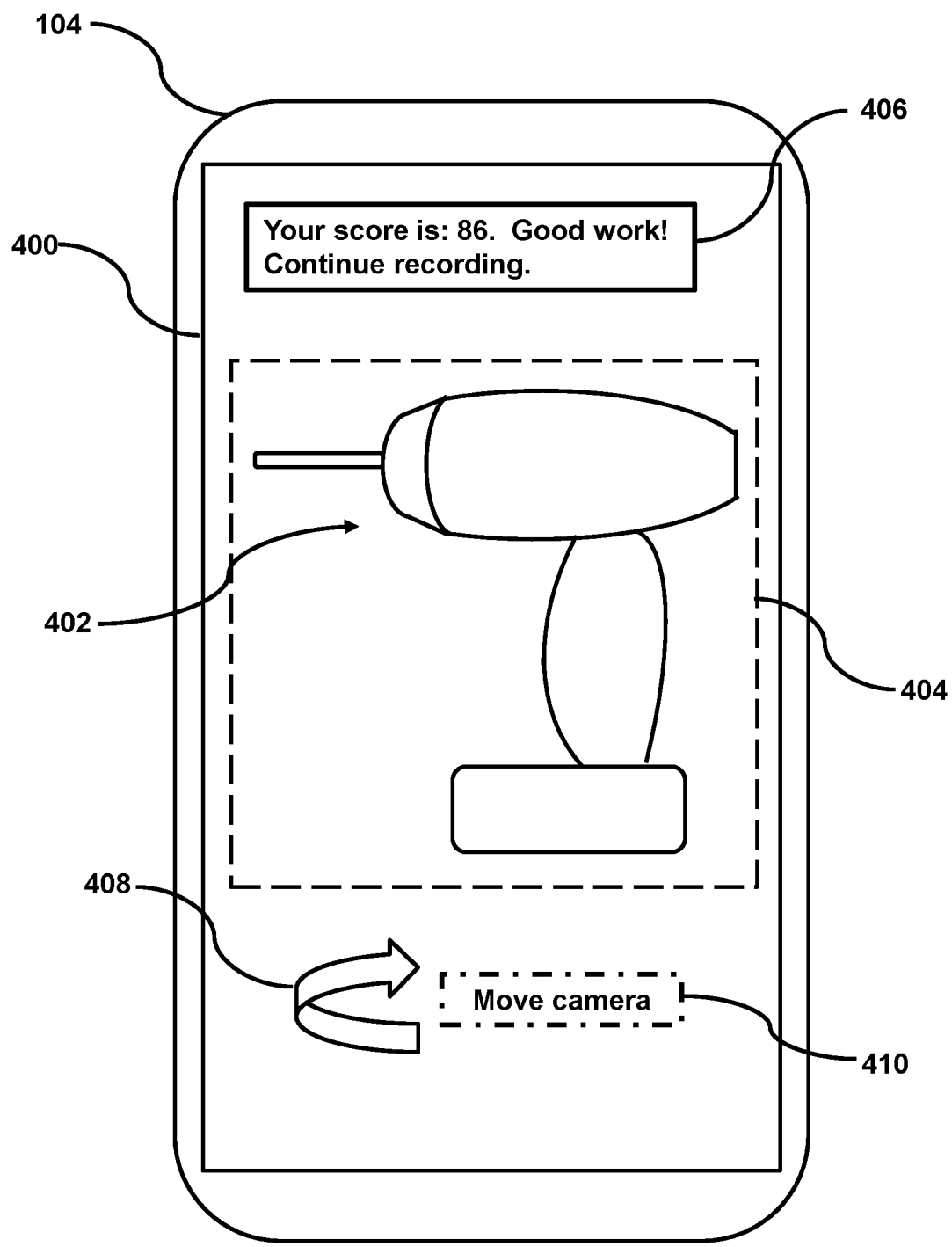
FIG. 4 illustrates an example user interface of an image-capture task displayed on a mobile computing device, in accordance with various embodiments.

FIG. 4 illustrates an example user interface of an image-capture task displayed on a mobile computing device, in accordance with various embodiments. In some embodiments, mobile computing device 104 may include a display screen 400, such as a touch screen. Various types of touch screens may include, but are not limited to, a resistive touch screen, a surface capacitive touch screen, a projected capacitive touch screen, a surface acoustic wave (SAW) touch screen, and an infrared (IR) touch screen. In some embodiments, display screen 400 may render a UI of a native application executing on mobile computing device 104. In some embodiments, the application may cause, or otherwise access, a camera or other image capturing component of mobile computing device 104. For example, mobile computing device 104 may include one or more rear-facing cameras, one or more front facing cameras, or both rear-facing and front-facing cameras. Upon launching the native application, the camera functionality of mobile computing device 104 may be activated, and the UI may cause the camera's view to be displayed on display screen 400.

In some embodiments, a user may orient mobile computing device 104 in a manner to cause an object to be viewable by the camera, and a view of the object may be displayed by display screen 400. Some embodiments may allow a user to view the object with their mobile computing device without requiring an image to be captured (e.g., in a "view-finding" mode), however the user may also be able to capture a video, time series of images, image burst, or a single image depicting the object. In some embodiments, upon launching the native application, a video recording process may commence whereby a candidate video is captured by mobile computing device 104. The candidate video may be stored locally in memory on mobile computing device 104, streamed to remote server system 110, or both. In some embodiments, while a video recording process commences and a candidate video is captured, an object 402 may be displayed by display screen 400. Object 402 may be, for example, a drill. In some embodiments, mobile computing device 104 may include a mini-classifier configured to generate and display a bounding box 404 surrounding any object detected within a displayed image. In some embodiments, bounding box 404 may be displayed on display screen 400 regardless of whether a candidate video or image is being captured.

As mentioned previously, video analysis subsystem 114 may analyze a candidate video obtained from mobile computing device 104, and may generate feedback and indications of one or more actions that may be performed to adjust mobile computing device 104 based on the image-capture task. In some embodiments, feedback 406 may be provided to mobile computing device 104 and displayed within the UI. Feedback 406 may include a score indicating how well the user is doing at completing the image-capture task, as well as additional information (e.g., instructions of whether to stop or continue recording, positive affirmations, etc.). In some embodiments, indications 408 and 410 may also be provided to mobile computing device 104 and displayed within the UI. For example, indication 408 may depict an arrow point in a direction that mobile computing device 104, or a camera component of mobile computing device 104, should move to obtain a desired image of the object (e.g., an image depicting the object from a different perspective). As another example, indication 410 may describe the action to be performed by the user (e.g., "Move camera").

Figure 5:
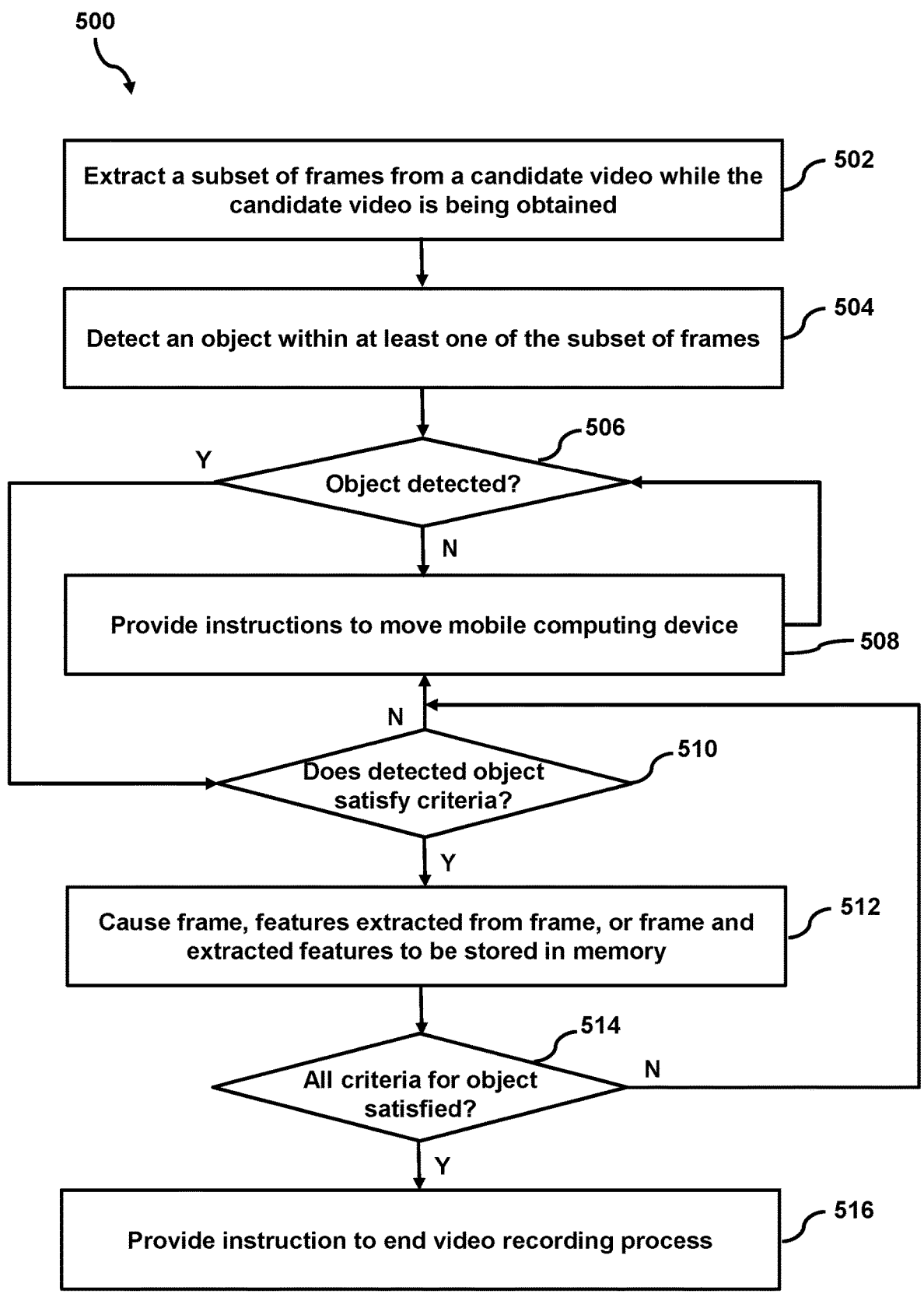
FIG. 5 illustrates an example process for performing an image-capture task, in accordance with various embodiments.

FIG. 5 illustrates an example process for performing an image-capture task, in accordance with various embodiments. In some embodiments, process 500 may begin at step 502. At step 502, a subset of frames from a candidate video may be extracted while the candidate video is being obtained. In some embodiments, the candidate video may be streamed to remote server system 110 from mobile computing device 104 as the candidate video is obtained. The portion of the candidate video that has been obtained by computer system 102 of remote server system 110 may be processed to determine whether a desired object was detected within the candidate video, and whether the object was oriented in a manner to supplement for a lacking image from the object's corresponding training data set. In some embodiments, a subset of frames of the candidate video may be extracted by splitting the candidate video (e.g., the portion of the candidate video obtained by computer system 102) into a subset of frames. The number of frames included in the subset of frames may be predefined. For example, the candidate video may be split into a number of frames based on a sub-sample rate, such as 30 fps, 60 fps, 100 fps, etc. Therefore, the number of frames included in the subset of frames is determined based on the temporal duration of the candidate video to be split up into frames, and the sub-sample rate. As an example, a 1 second candidate video sub-sampled at 30 fps would yield 30 frames. In some embodiments, step 502 may be performed by a subsystem that is the same or similar to video analysis subsystem 114.

At step 504, an object may be detected or attempted to be detected within at least one of the subset of frames. In some embodiments, an object detection model may be retrieved from model database 140 and used to determine whether an object is present within a frame from the subset of frames. The object detection model may be a generic object detection model that is configured to detect the presence of an object within an image. For example, the generic object detection model may be trained on a set of training data including images of various objects (e.g., dogs, tables, soccer balls, planets, etc.). In some embodiments, the object detection model may be a specific object detection model trained using an existing training data set corresponding to the object. For example, if the image capture task is for capturing a video of a drill, the object detection model obtained to determine whether an object (e.g., a drill) is present in one of the subset of frames may be a previously trained instance of the object recognition model. In some embodiments, the object recognition model may be a specific object detection model trained using a training data set including images of an object that is determined to be similar to the object to be captured by the video for the image-capture task. For example, if the object to be detected via the candidate video is a soccer ball, then a previously trained object detection model trained using images of basketballs may be used. In some embodiments, a determination of a similar object may be computed by estimating a distance in feature space between a vector representing the object to be captured and an object depicted by images in a previously generated training data set. In some embodiments, step 504 may be performed by a subsystem that is the same or similar to video analysis subsystem 114.

At step 506, a determination may be made as to whether the object (e.g., the object indicated by the image-capture task) was detected within any of the subset of frames. If not, process 500 may proceed to step 508. At step 508, instructions may be provided to mobile computing device 104 to cause mobile computing device 104 to move. In some embodiments, if no object was detected, or the indicated object was not detected, within any of the frames of the subset of frames, then the image-capture task may generate, specify, and provide actions that may be taken to try and capture additional images (or video) depicting the object. For example, the instructions may indicate to a user that mobile computing device 104 should be moved in a particular direction (e.g., right, left, up, down), rotated about an axis, etc., to attempt to capture the object via the candidate video. In some embodiments, steps 506 and 508 may be performed by a subsystem that is the same or similar to video analysis subsystem 114.

If, at step 506, it was determined that the object was detected within at least one frame of the subset of frames, then process 500 may proceed to step 510. At step 510, a determination may be made as to whether the detected object satisfies certain criteria. For instance, a determination may be made as to whether the object as depicted by the frame (or frames) satisfies one or more criteria along one or more dimensions. As an example, a determination may be made as to whether the object depicted in the frame has a perspective that is currently missing or lacking from the training data set. If, at step 510, it is determined that the detected object does not satisfy the criteria, then process 500 may return to step 508. However, if it is determined, at step 510, that the detected object does satisfy the criteria, then process 500 may proceed to step 512. In some embodiments, step 510 may be performed by a subsystem that is the same or similar to video analysis subsystem 114.

At step 512, the frame determined to depict the object satisfying the criteria, features extracted from the frame, or the frame and the features, may be caused to be stored in memory. In some embodiments, the frame, the features, or both may be added to a training data set to be used to train an object recognition model for recognizing the object within an image. The frame, features, or both may be added to the training data set and stored in training data database 138. At step 514, a determination may be made as to whether all of the criteria for the training data set has been satisfied. For example, a determination may be made as to whether additional images depicting the object are needed, those images being images of the object generally, images of the object in certain perspectives, lighting conditions, backgrounds, configurations, or a combination thereof. If, at step 514, it is determined that not all of the criteria has been satisfied (e.g., additional perspectives of the object are needed), then process 500 may return to step 508. However, if the criteria have all been satisfied, then process 500 may proceed to step 516. At step 516, an instruction may be provided to mobile computing device 104 to cause the video recording process to end. In some embodiments, the instruction may automatically cause the video recording process to end, however alternatively the instruction may provide a notification to the user to manually cause the video recording process to end. In some embodiments, steps 512-516 may be performed by a subsystem that is the same or similar to video analysis subsystem 114.

In some embodiments, one or more steps from process 500 may be performed locally on mobile computing device 104. For example, step 504 may be performed locally using an object detection model stored locally on mobile computing device. Thus, even though the steps of process 500 are described in the context of operations performed by a subsystem or subsystems of computer system 102 of remote server system 110, some or all of these steps may be performed by client-side functionality of mobile computing device 104.

Figure 6:
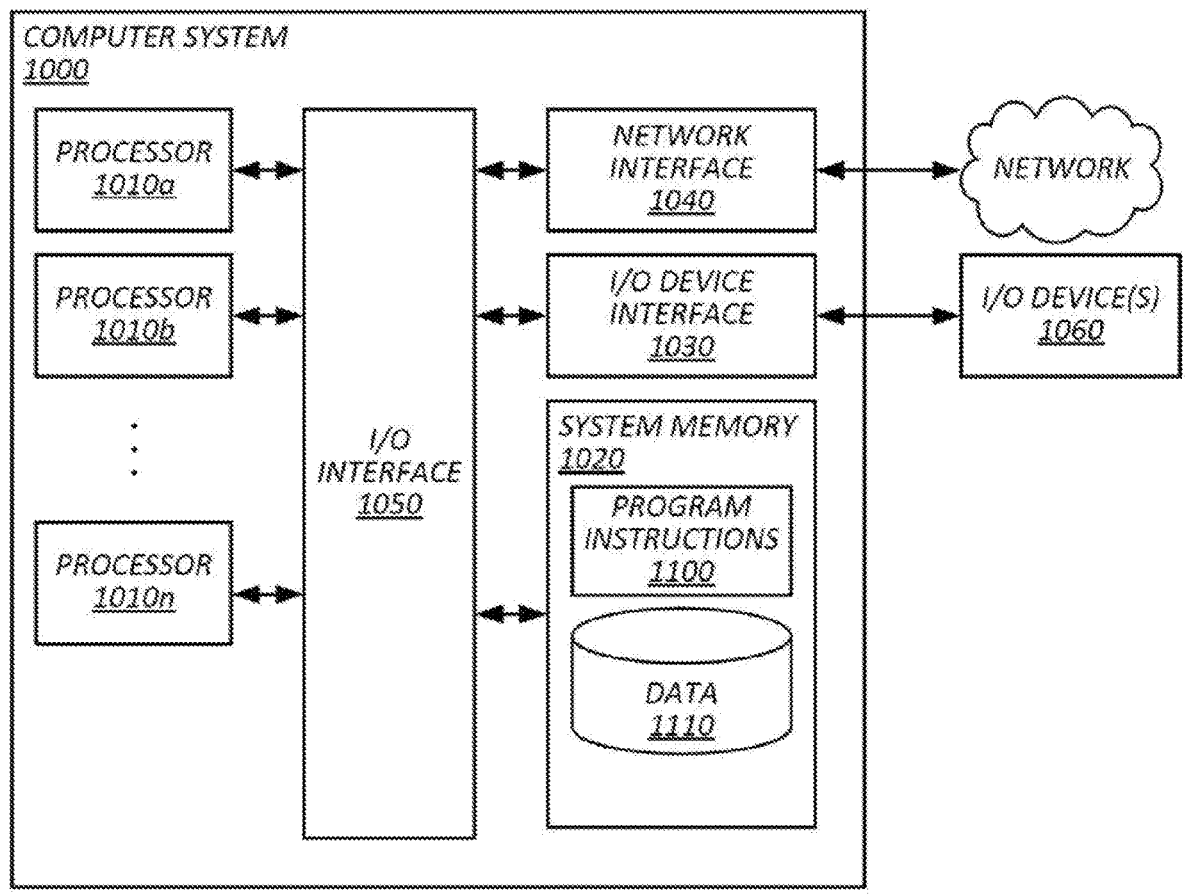
FIG. 6 illustrates an example of a computing system by which the present techniques may be implemented, in accordance with various embodiments.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

In some embodiments, a processor may include an AI accelerator chips. For instance, AI accelerator chips may be deployed on a computing device, such as a mobile computing device. AI accelerator chips may be designed particularly for artificial intelligence applications such as neural networks and machine learning processes. In some embodiments, an AI accelerator chip may include multiple CPUs, multi-core GPUs, and a multi-core neural engine.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method, comprising: providing, with the computer system, a set of instructions to a mobile computing device, wherein the set of instructions indicate (i) a first object to be identified and (ii) that a video of at least the object is to be captured; obtaining, with the computer system, a candidate video of the object captured by the mobile computing device; splitting, with the computer system, the candidate video into a plurality of frames; mapping, with the computer system, each of the plurality of frames to an embedding space based on features extracted from the object depicted in the frame, wherein the embedding space, after the mapping, comprises clusters each representing a different focus of the candidate video; determining, with the computer system, one or more salient frames for each of the plurality of clusters; extracting, with the computer system, features of the object as depicted in the one or more salient frames of each of the plurality of clusters; and storing, with the computer system, at least the features of the object in the one or more salient frames of each of the plurality of clusters in memory, wherein the features of the object in the one or more salient frames of each of the plurality of clusters are to be used to generate or update training data used to train an object-recognition model.

A2. The method of embodiment A1, wherein: the set of instructions indicates a plurality of objects to be identified including the first object and that the video to captured is of the plurality of objects; the different focus of the candidate video corresponds to a different object of the plurality of objects; each of the clusters corresponds to one of the plurality of objects; the features of the object in the one or more salient frames of each of the plurality of clusters one or more salient frames from each cluster of the plurality of clusters represent a different object of the plurality of objects and are used to generate or update the training data or additional training data to train the object-recognition model.

A3. The method of any of embodiments A1-A2, wherein the image-capture task provides a visual indication to the user via a user interface rendered by a display screen of the mobile computing device of how the mobile computing device is to be moved to cause different perspectives and lighting conditions of the object to be captured within the candidate video.

B1. A method comprising: obtaining, with a mobile computing device, an image-capture task from a remote server system, wherein: the image-capture task comprises a request for a video of an object to be captured, the image-capture task provides an indication of the object to be captured via the video, and the image-capture task causes the mobile computing device to present instructions via a native application executing on the mobile computing device, the instructions describing how the video of the object is to be captured; obtaining, with the mobile computing device, a candidate video of the object, wherein the candidate video comprises the object captured from multiple perspectives and with multiple lighting conditions, wherein obtaining the candidate video comprises: determining, with the mobile computing device, while obtaining the candidate video, feedback indicating whether first criteria along a first dimension and second criteria along a second dimension are satisfied based on the instructions, and causing, with the mobile computing device, while obtaining the candidate video, (i) the feedback and (ii) an indication of one or more actions capable of being performed to adjust a video recording process, to be presented via the native application; and providing, with the mobile computing device, to the remote server system, (i) the candidate video, (ii) features of the object extracted from the candidate video, or (iii) the candidate video and features of the object extracted from the candidate video, wherein the remote server system is configured to generate training data for training an object recognition model.

B2. The method of embodiment B1, further comprising: determining, with the mobile computing device, a geo-location of the mobile computing device; accessing, with the mobile computing device, an inventory database storing object location information indicating facilities where instances of the object are available; and determining, with the mobile computing device, based on the object location information, that an instance of the object is located at one of the facilities, wherein the image-capture task is obtained from the remote server system automatically in response to determining that the geo-location of the mobile computing device is within a predefined distance of the one of the facilities.

B3. The method of any of embodiments B1-B2, wherein the object comprises a product, the indication of the object to be captured comprises at least one of: a barcode associated with the product, a Stock Keeping Unit (SKU) of the product, a serial number of the product, a Quick Response (QR) code associated with the product, or a name of the product.

B4. The method of any of embodiments B1-B3, further comprising: obtaining, with the mobile computing device, and prior to the candidate video of the object being obtained, a candidate indication of a candidate object; determining, with the mobile computing device, based on the candidate indication, that the candidate object is the object; and causing, with the mobile computing device, a video recording functionality associated with the mobile computing device to be activated to capture the candidate video.

B5. The method of any of embodiments B1-B4, wherein the image-capture task comprises capturing the object at a plurality of perspectives and with a plurality of lighting conditions with which images of the object are needed for the training data.

B6. The method of embodiment B5, wherein determining the feedback comprises: extracting, with the mobile computing device, a subset of frames from the candidate video as the candidate video is being obtained; determining, with the mobile computing device, based on the subset of frames, that the object has been captured within at least one of the subset of frames; and determining, with the mobile computing device, whether the object, as captured in the at least one of the subset of frames, comprises at least one of the plurality of perspectives, at least one of the plurality of lighting conditions, or the at least one of the plurality of perspectives and the at least one of the plurality of lighting conditions.

B7. The method of embodiment B6, further comprising: determining, with the mobile computing device, that the object, as captured in the at least one of the subset of frames, differs from the plurality of perspectives and the plurality of lighting conditions; and generating, with the mobile computing device, the feedback and the indication of the one or more actions to be performed, wherein: the feedback comprises a visual notification to be rendered within a user interface of the native application indicating that a current perspective and a current lighting condition of the object differs from the plurality of perspective views and the plurality of lighting conditions, and the one or more actions to be performed comprise the mobile computing device or a video capturing component communicatively coupled to the mobile computing device being moved such that the object is captured by the candidate video at a new perspective and with a new lighting condition.

B8. The method of any of embodiments B1-B7, further comprising: determining, with the mobile computing device, that a set of images of the object available for generating the training data prior to the candidate video being obtained lacks images from a plurality of perspectives and a plurality of lighting conditions; generating, with the mobile computing device, the image-capture task such that the instructions presented via the native application are to cause the mobile computing device to capture the object within the candidate video from at least some of the plurality of perspectives and the plurality of lighting conditions.

B9. The method of any of embodiments B1-B8, further comprising: extracting, with the mobile computing device, one or more frames from the candidate video while the candidate video is being obtained; computing, with the mobile computing device, a first image quality metric and a second image quality metric based on the one or more frames; determining, with the mobile computing device, whether (i) the first image quality metric satisfies the first criteria along the first dimension and (ii) the second image quality metric satisfies the second criteria along the second dimension; and generating, with the mobile computing device, the feedback and the indication of the one or more actions based on whether (i) the first image quality metric satisfies the first criteria along the first dimension and (ii) the second image quality metric satisfies the second criteria along the second dimension.

B10. The method of embodiment B9, wherein: the first image quality metric comprises a blur score; and the second image quality metric comprises a local outlier factor measure.

B11. The method of any of embodiments B1-B10, wherein: the image-capture task comprises an additional request for an additional object to be captured via the video; the image-capture task comprises an additional indication of the additional object; and the instructions further describe how the video of the additional object is to be captured, wherein obtaining the candidate video comprises obtaining the candidate video of the object and the additional object.

B12. The method of embodiment B11, further comprising: generating, with the mobile computing device, a plurality of frames of the candidate video; mapping, with the mobile computing device, each of the plurality of frames to an embedding space; and determining, with the mobile computing device, based on a density of clusters formed in the embedding space by the mapping of each of the plurality of frames, one or more salient frames for the object and one or more salient frames for the additional objects, wherein: each of the clusters represents either the object or the additional object, the one or more salient frames for the object are used to generate the training data for training the object recognition model to identify the object, and the one or more salient frames for the additional object are used to generate additional training data for training the object recognition model to identify the additional object.

B13. The method of any of embodiments B1-B12, further comprising: obtaining, with the mobile computing device, device orientation information based on one or more inertial measurement units resident on the mobile computing device, wherein the indication of the one or more actions are determined based on the device orientation information and the feedback.

B14. The method of any of embodiments B1-B13, further comprising: extracting, with the mobile computing device, the features of the object from the candidate video, wherein the features comprise: one or more visual features of the object in a multidimensional continuous feature space, and the one or more visual features of the object are generated based on one or more salient frames identified from the candidate video.

B15. The method of embodiment B14, wherein the one or more visual features are used to adjust parameters of the object recognition model for identifying the object in newly obtained images.

B16. The method of any of embodiments B1-B15, wherein the object recognition model comprises a deep neural network comprising six or more layers.

C1. A method, comprising: obtaining, with a mobile computing device, a task from a remote server system, wherein: the task comprises a request for a video of an object to be captured, the task provides an indication of the object to be depicted in the video, and the task causes the mobile computing device to present instructions via a native application executing on the mobile computing device, the instructions describing how the video of the object is to be captured; initiating, with the mobile computing device, capture of a candidate video of the object; determining, with the mobile computing device, while or after capturing the candidate video, based on at least part of the candidate video, whether a first criteria along a first dimension is satisfied based on the instructions; determining, with the mobile computing device, while or after capturing the candidate video, based on at least part of the candidate video, whether a second criteria along a second dimension is satisfied based on the instructions; causing, with the mobile computing device, feedback to be displayed by a display screen of the mobile computing device application based on results of whether the first criteria along the first dimension was satisfied and whether the second criteria along the second dimension was satisfied, the feedback indicating at least one of: an adjustment to a pose of a camera of the mobile computing device, or an adjustment to a scene in which the object is disposed; and providing, with the mobile computing device, to the remote server system, the candidate video or training data generated based on the candidate video, wherein: the candidate video depicts the object from at least one of: multiple camera poses or multiple dispositions of the object, and the remote server system uses the candidate video or the training data generated based on the candidate video to train a computer-vision object recognition model.

C2. The method of embodiment C1, further comprising: determining, with the mobile computing device, a geo-location of the mobile computing device; accessing, with the mobile computing device, an inventory database storing object location information indicating facilities where instances of the object are available; and determining, with the mobile computing device, based on the object location information, that an instance of the object is located at one of the facilities, wherein the task is obtained from the remote server system automatically in response to determining that the geo-location of the mobile computing device is within a threshold distance of the one of the facilities.

C3. The method of any one of embodiments C1-C2, wherein the object comprises a product, the indication of the object to be captured comprises at least one of: a barcode associated with the product, a Stock Keeping Unit (SKU) of the product, a serial number of the product, a Quick Response (QR) code associated with the product, or a name of the product.

C4. The method of any one of embodiments C1-C3, further comprising: obtaining, with the mobile computing device, and prior to capture of the candidate video being initiated, a candidate indication of a candidate object; determining, with the mobile computing device, based on the candidate indication, that the candidate object is the object; and causing, with the mobile computing device, a video recording functionality associated with the mobile computing device to be activated to initiate the capture the candidate video.

C5. The method of any one of embodiments C1-C4, wherein the task comprises capturing the object at a plurality of perspectives or with a plurality of contexts with which images of the object are needed for the training data.

C6. The method of embodiment C5, further comprising: determining the feedback by: extracting, with the mobile computing device, a subset of frames from the candidate video while or after capturing the candidate video; determining, with the mobile computing device, based on the subset of frames, that the object has been captured within at least one of the subset of frames; and determining, with the mobile computing device, whether the object, as captured in the at least one of the subset of frames, comprises at least one of the plurality of perspectives, at least one of the plurality of contexts, or at least one of the plurality of perspectives and at least one of the plurality of contexts.

C7. The method of embodiment C6, further comprising: determining, with the mobile computing device, that the object, as captured in the at least one of the subset of frames, differs from the plurality of perspectives or the plurality of contexts; and generating, with the mobile computing device, the feedback including one or more actions to be performed to cause the adjustment to the pose of the camera or the adjustment to the scene, wherein: the feedback comprises a visual notification to be rendered within a user interface of the native application displayed via the display screen, the visual notification indicating that a current perspective and a current context of the object differs from the plurality of perspectives and the plurality of contexts.

C8. The method of any one of embodiments C1-C7, further comprising: determining, with the mobile computing device, that a set of images of the object available for generating the training data prior to the candidate video being captured lacks images from a plurality of perspectives and a plurality of contexts; and generating, with the mobile computing device, the task such that the instructions presented via the native application cause the mobile computing device to capture the object within the candidate video from at least some of the plurality of perspectives and the plurality of contexts.

C9. The method of any one of embodiments C1-C8, further comprising: extracting, with the mobile computing device, one or more frames from the candidate video while or after capturing the candidate video; computing, with the mobile computing device, a first image quality metric and a second image quality metric based on the one or more frames; determining, with the mobile computing device, based on a first result of the first image quality metric and a second result of the second image quality metric, whether the first criteria along the first dimension and the second criteria along the second dimension are satisfied; and generating, with the mobile computing device, the feedback based on the first result of the first image quality metric and the second result of the second image quality metric.

C10. The method of embodiment C9, wherein: the first image quality metric comprises a blur score; and the second image quality metric comprises a local outlier factor (LOF) measure.

C11. The method of embodiment C10, wherein the blur score and the LOF measure are used to determine a saliency score for each frame of the candidate video, the method further comprises: causing, with the mobile computing device, frames from the candidate video to be stored in memory in response to determining that the saliency score for a respective frame satisfies a threshold condition, wherein the training data is generated based on each respective frame from the candidate video having a respective saliency score satisfying the threshold condition.

C12. The method of any one of embodiments C1-C11, wherein: the task comprises an additional request for an additional object to be captured via the video; the task comprises an additional indication of the additional object; and the instructions further describe how the video of the additional object is to be captured, wherein the object and the additional object are both to be captured by the candidate video.

C13 The method of embodiment C12, further comprising: extracting, with the mobile computing device, a plurality of frames from the candidate video; generating, with the mobile computing device, an embedding vector for each of the plurality of frames, wherein each embedding vector is mapped to an embedding space; and determining, with the mobile computing device, clusters in the embedding space; selecting, with the mobile computing device, a subset of frames from the plurality of frames as being salient frames based on a centroid of each of the clusters; and providing, with the mobile computing device, the subset of the plurality of frames to the remote server system to generate or update the training data used to train the computer-vision object recognition model.

C14. The method of embodiment C13, wherein the image has a first number of features and each embedding vector has a second number of elements, wherein the second number of elements is less than the first number of features.

C15. The method of any one of embodiments C1-C14, further comprising: obtaining, with the mobile computing device, device orientation information based on one or more inertial measurement units (IMUs) resident on the mobile computing device, wherein the adjustment to the pose of the camera of the mobile computing device is determined based on the device orientation information.

C16. The method of any one of embodiments C1-C15, further comprising: extracting, with the mobile computing device, features of the object from the candidate video, wherein the features comprise one or more visual features generated based on one or more frames extracted from the candidate video, wherein the one or more frames are determined to as being salient frames.

C17. The method of embodiment C16, wherein the one or more visual features are used to adjust weights and biases of the computer-vision object recognition model to improve an ability of the computer-vision object recognition model to recognize an instance of the object or an instance of a similar object within a new image.

C18. The method of any one of embodiments C1-C17, wherein: the computer-vision object recognition model comprises a neural network comprising six or more layers, at least some of the layers comprising a convolutional layer; and the operations comprise steps for determining whether frames of video satisfy task criteria.

C19. The method of any one of embodiments C1-C18, wherein: the computer-vision object recognition model comprises a neural network comprising one or more depthwise convolution layers.

D1. A tangible, non-transitory, machine-readable medium storing instructions that when executed by a data processing apparatus cause the data processing apparatus to perform operations comprising: the method of any one of embodiments A1-A3, B1-B16, or C1-C19.

E1. A system, comprising: one or more processors; and memory storing instructions that when executed by the processors cause the processors to effectuate operations comprising: the method of any one of embodiments A1-A3, B1-B16, or C1-C19.

What is claimed is:

1. A tangible, non-transitory, computer-readable medium storing one or more computer programs that, when executed by one or more processors, effectuate operations comprising:

computing, with a computer system, a metric indicative of need to augment a training set used to train an object recognition model;

determining, with the computer system, to augment the training set based on a comparison of the metric to a threshold;

obtaining, with the computer system, a set of instructions to be provided to a mobile computing device, wherein the set of instructions indicates (i) a first object to be identified and (ii) that a video of at least the first object is to be captured;

after determining to augment the training set, providing, with the computer system, the set of instructions to the mobile computing device;

obtaining, with the computer system, from the mobile computing device, a candidate video of the first object captured by the mobile computing device, wherein the candidate video is captured based on the set of instructions, and wherein the candidate video comprises a plurality of frames;

selecting, with the computer system, a subset of frames from the plurality of frames in response to determining each frame of the subset of frames depicts the first object;

extracting, with the computer system, features of the first object as depicted in each frame of the subset of frames; and storing, with the computer system, the features extracted from each frame of the subset of frames in memory, wherein training data used to train the object recognition model is generated or updated based on the features extracted from each frame of the subset of frames.

2. The tangible, non-transitory, computer-readable medium of claim 1, wherein:

the set of instructions indicates (i) a plurality of objects to be identified including the first object, and (ii) the plurality of objects are to be captured by the candidate video;

the candidate video depicts the plurality of objects;

a respective subset of frames from the plurality of frames is selected for each of the plurality of objects; and features of the plurality of objects depicted in the respective subsets of frames are used to generate or update the training data or additional training data to be used to train the object recognition model.

3. The tangible, non-transitory, computer-readable medium of claim 1, wherein:

the set of instructions do not require that a plurality of objects are to be captured by the candidate video;

the computer system is the mobile computing device;

the set of instructions provides a visual indication to be rendered via a user interface displayed on a display screen of the mobile computing device; and the visual indication describes how the mobile computing device is to be moved to obtain different perspectives or contexts of the first object within the candidate video; and selecting the subset of frames comprises:

extracting features of the plurality of frames;

forming, for each frame among the plurality of frames, a respective vector in an embedding space based on features extracted from the respective frame;

clustering the vectors in the embedding space to form a plurality of clusters;

designating, for each cluster among the plurality of clusters, one or more vectors of the respective cluster as representative of the respective cluster; and determining respective frames are salient frames in response to designating vectors corresponding to the respective frames as representative.

4. The tangible, non-transitory, computer-readable medium of claim 1, wherein computing the metric comprises:
steps for computing the metric indicative of the need to augment the training set.

5. The tangible, non-transitory, computer-readable medium of claim 1, wherein the metric is indicative of an accuracy of the object recognition model with respect to the first object.

6. The tangible, non-transitory, computer-readable medium of claim 1, wherein the metric further indicates a camera pose relative to the first object.

7. The tangible, non-transitory, computer-readable medium of claim 1, wherein the metric is a count of images depicting the first object.

8. The tangible, non-transitory, computer-readable medium of claim 1, wherein the metric is based on a size or a location of a volume in an embedding space unoccupied by a vector corresponding to a member of the training set corresponding to the first object.

9. A tangible, non-transitory, computer-readable medium storing one or more computer programs that when executed by one or more processors effectuate operations comprising:
obtaining, with a mobile computing device, a task from a remote server system, wherein:
the remote server system comprises an object recognition computer vision model trained on training data,
the task is created responsive to determining that the training data is to be augmented with respect to an object,
the task comprises a request for a video of the object to be captured,
the task provides an indication of the object to be depicted in the video, and
the task causes the mobile computing device to present instructions via a native application executing on the mobile computing device, the instructions describing how the video of the object is to be captured;
initiating, with the mobile computing device, capture of a candidate video of the object;
determining, with the mobile computing device, while capturing the candidate video, based on at least part of the captured candidate video, whether a first criteria along a first dimension is satisfied based on the instructions;
determining, with the mobile computing device, while capturing the candidate video, based on at least part of the captured candidate video, whether a second criteria along a second dimension is satisfied based on the instructions;
presenting, with the mobile computing device, feedback based on results of the determinations, the feedback indicating one or more actions to be performed, wherein:
the feedback is presented while capturing the candidate video, and
the one or more actions facilitate capture of one or more additional images depicting the object for updating the training data, the one or more actions comprising at least one of:
an adjustment to pose of a camera of the mobile computing device, or
an adjustment to a scene in which the object is disposed; and
sending, with the mobile computing device, to the remote server system, at least one of: (i) at least a portion of the candidate video, (ii) one or more frames extracted from the candidate video, or (iii) additional training data based on the candidate video, wherein:
the candidate video depicts the object from multiple camera poses, and
the remote server system uses the at least one of: (i) the at least the portion of the candidate video, ii) the one or more frames extracted from the candidate video, or (iii) the additional training data based on the candidate video to train the object recognition computer vision model or another object recognition computer vision model.

10. The tangible, non-transitory, computer-readable medium of claim 9, wherein the operations further comprise:
determining, with the mobile computing device, a geo-location of the mobile computing device;
accessing, with the mobile computing device, an inventory database storing object location information indicating facilities where instances of the object are available; and
determining, with the mobile computing device, based on the object location information, that an instance of the object is located at one of the facilities, wherein the task is obtained from the remote server system automatically in response to determining that the geo-location of the mobile computing device is within a threshold distance of the one of the facilities.

11. The tangible, non-transitory, computer-readable medium of claim 9, wherein the object comprises a product, the indication of the object to be captured comprises at least one of: a barcode associated with the product, a Stock Keeping Unit (SKU) of the product, a serial number of the product, a Quick Response (QR) code associated with the product, or a name of the product.

12. The tangible, non-transitory, computer-readable medium of claim 9, wherein the operations further comprise:
obtaining, with the mobile computing device, and prior to the candidate video of the object being captured, a candidate indication of a candidate object;
determining, with the mobile computing device, based on the candidate indication, that the candidate object is the object; and
causing, with the mobile computing device, a video recording functionality associated with the mobile computing device to be activated to capture the candidate video.

13. The tangible, non-transitory, computer-readable medium of claim 9, wherein the task comprises capturing the object at a plurality of perspectives or with a plurality of contexts with which images of the object are needed for the training data.

14. The tangible, non-transitory, computer-readable medium of claim 13, wherein determining the feedback comprises:
extracting, with the mobile computing device, a subset of frames from the candidate video as the candidate video is being obtained;
determining, with the mobile computing device, based on the subset of frames, that the object has been captured within at least one of the subset of frames; and
determining, with the mobile computing device, whether the object, as captured in the at least one of the subset of frames, comprises at least one of the plurality of perspectives, at least one of the plurality of contexts, or the at least one of the plurality of perspectives and the at least one of the plurality of contexts.

15. The tangible, non-transitory, computer-readable medium of claim 14, wherein the operations further comprise:
   determining, with the mobile computing device, that the object, as captured in the at least one of the subset of frames, differs from the plurality of perspectives or the plurality of contexts; and
   generating, with the mobile computing device, the feedback and an indication of the one or more actions to be performed, wherein:
      the feedback comprises a visual notification to be rendered within a user interface of the native application indicating that a current perspective and a current context of the object differs from the plurality of perspectives and the plurality of contexts, and
      the one or more actions to be performed comprise the mobile computing device or a video capturing component communicatively coupled to the mobile computing device being moved such that the object is captured by the candidate video at a new perspective and with a new context.

16. The tangible, non-transitory, computer-readable medium of claim 9, wherein the operations further comprise:
   determining, with the remote server system, that a set of images of the object available for generating the training data prior to the candidate video being captured lacks images from a plurality of perspectives and a plurality of contexts; and
   generating, with the server system, the task such that the instructions presented via the native application are to cause the mobile computing device to capture the object within the candidate video from at least some of the plurality of perspectives and the plurality of contexts.

17. The tangible, non-transitory, computer-readable medium of claim 9, wherein the operations further comprise:
   extracting, with the mobile computing device, a plurality of frames from the candidate video while the candidate video is being captured;
   computing, with the mobile computing device, a first image quality metric and a second image quality metric based on the plurality of frames;
   determining, with the mobile computing device, whether (i) the first image quality metric satisfies the first criteria along the first dimension and (ii) the second image quality metric satisfies the second criteria along the second dimension; and
   generating, with the mobile computing device, the feedback and an indication of the one or more actions based on whether (i) the first image quality metric satisfies the first criteria along the first dimension and (ii) the second image quality metric satisfies the second criteria along the second dimension.

18. The tangible, non-transitory, computer-readable medium of claim 17, wherein:
   the first image quality metric comprises a blur score; and
   the second image quality metric comprises a local outlier factor measure.

19. The tangible, non-transitory, computer-readable medium of claim 9, wherein:
   the task comprises an additional request for an additional object to be captured via the video;
   the task comprises an additional indication of the additional object; and
   the instructions further describe how the video of the additional object is to be captured, wherein obtaining the candidate video comprises obtaining the candidate video of the object and the additional object.

20. The tangible, non-transitory, computer-readable medium of claim 19, wherein the operations further comprise:
   capturing, with the mobile computing device, a plurality of frames of the candidate video;
   mapping, with the mobile computing device, at least part of each of the plurality of frames to an embedding space;
   determining, with the mobile computing device, clusters in the embedding space;
   classifying a subset of the plurality of frames as representative frames based on positions of the subset of frames in the clusters; and
   selecting the subset of the plurality of frames to be sent to the remote server system and used to train the object recognition computer vision model.

21. The tangible, non-transitory, computer-readable medium of claim 9, wherein the operations further comprise:
   obtaining, with the mobile computing device, device orientation information based on one or more inertial measurement units resident on the mobile computing device, wherein an indication of the one or more actions to be performed is determined based on the device orientation information and the feedback.

22. The tangible, non-transitory, computer-readable medium of claim 9, wherein the operations further comprise:
   extracting, with the mobile computing device, features of the object from the candidate video, wherein the features comprise:
      one or more visual features of the object in a multidimensional continuous feature space, and
      the one or more visual features of the object are generated based on one or more salient frames identified from the candidate video.

23. The tangible, non-transitory, computer-readable medium of claim 22, wherein the one or more visual features are used to adjust parameters of the object recognition computer vision model for identifying the object in newly obtained images.

24. The tangible, non-transitory, computer-readable medium of claim 9, wherein:
   the object recognition computer vision model comprises a neural network comprising six or more layers, at least some of the layers comprising a convolutional layer; and
   the operations comprise steps for determining whether frames of video satisfy task criteria.

25. The tangible, non-transitory, computer-readable medium of claim 9, wherein:
   determining whether the first criteria along the first dimension is satisfied is performed with another computer vision model executed by the mobile computing device and comprising a neural network with depth-separable convolutions.

26. A method, comprising:
   obtaining, with a mobile computing device, a task from a remote server system, wherein:
      the task comprises a request for a video of an object to be captured,
      the task provides an indication of the object to be depicted in the video, and
      the task causes the mobile computing device to present instructions via a native application executing on the mobile computing device, the instructions describing how the video of the object is to be captured;

initiating, with the mobile computing device, capture of a candidate video of the object;

determining, with the mobile computing device, while or after capturing the candidate video, based on at least part of the captured candidate video, whether a first criteria along a first dimension is satisfied based on the instructions;

determining, with the mobile computing device, while or after capturing the candidate video, based on at least part of the captured video, whether a second criteria along a second dimension is satisfied based on the instructions;

presenting, with the mobile computing device, feedback based on results of the determinations, the feedback indicating one or more actions to be performed, wherein:

the feedback is presented while capturing the candidate video, training data for training an object recognition computer vision model includes images depicting the object, a metric indicative of a need to augment the training data is computed, the training data is to be updated to include additional images depicting the object based on a comparison of the metric to a threshold, and the one or more actions facilitate capture of one or more of the additional images depicting the object for updating the training data, the one or more actions comprising at least one of:

an adjustment to pose of a camera of the mobile computing device, or an adjustment to a scene in which the object is disposed; and sending, with the mobile computing device, to the remote server system, the candidate video or training data based on the candidate video, wherein:

the candidate video depicts the object from multiple camera poses, and the remote server system uses the candidate video or the training data based on the candidate video to train the object recognition computer vision model.

* * * * *